United States Patent
Ho et al.

(10) Patent No.: US 11,858,524 B1
(45) Date of Patent: Jan. 2, 2024

(54) VEHICLE SENSOR DEGRADATION TESTING

(71) Applicant: Zoox, Inc., Foster City, CA (US)

(72) Inventors: Holly Ho, Palo Alto, CA (US); Christopher William Labadie, San Francisco, CA (US); Ryan McMichael, Mountain View, CA (US); Joseph Patrick Warga, San Francisco, CA (US)

(73) Assignee: Zoox, Inc., Foster City, CA (US)

( * ) Notice: Subject to any disclaimer, the term of this patent is extended or adjusted under 35 U.S.C. 154(b) by 208 days.

(21) Appl. No.: 16/863,376

(22) Filed: Apr. 30, 2020

(51) Int. Cl.
  *B60W 50/04* (2006.01)
  *G01M 9/04* (2006.01)

(52) U.S. Cl.
  CPC .......... *B60W 50/045* (2013.01); *G01M 9/04* (2013.01); *B60W 2420/42* (2013.01); *B60W 2520/10* (2013.01); *B60W 2520/14* (2013.01); *B60W 2555/20* (2020.02)

(58) Field of Classification Search
  CPC .......... G01M 9/00; G01M 9/04; B60W 40/04; B60W 40/045
  See application file for complete search history.

(56) References Cited

U.S. PATENT DOCUMENTS

| | | | |
|---|---|---|---|
| 2018/0029597 A1* | 2/2018 | Gage | F02D 13/02 |
| 2019/0241158 A1* | 8/2019 | Ghannam | G05D 1/0238 |
| 2020/0094785 A1* | 3/2020 | Herman | G06V 20/56 |
| 2020/0249702 A1* | 8/2020 | Thurling | B64C 39/024 |

OTHER PUBLICATIONS

U.S. Appl. No. 16/708,019, Modalavalasa, et al., "Perception Error Models", filed Dec. 9, 2019, 68 pages.
U.S. Appl. No. 16/728,910, Canady, et al., "Sensor Degradation Monitor", filed Dec. 27, 2019, 37 pages.

* cited by examiner

*Primary Examiner* — Imran K Mustafa
(74) *Attorney, Agent, or Firm* — Lee & Hayes, P.C.

(57) ABSTRACT

A wind tunnel test may be performed on a vehicle to determine accumulation of substances (e.g., water) on sensors of the vehicle. Control surfaces may be created for the sensors based images representing the accumulations, where the control surfaces represent the include obstructions located where accumulations were detected during the test. The vehicle may then navigate around an environment using the control surfaces in order to determine a drivability of the vehicle. Also, a simulation may be performed, where the simulation outputs images representing simulated accumulations on the sensors. The outputs from the simulation may be compared to the results from the test in order to determine how accurately the simulation represents the test, determine domains in which the vehicle may safely operate, and/or improve the simulation.

22 Claims, 9 Drawing Sheets

VEHICLE SENSOR DEGRADATION TESTING

BACKGROUND

Data captured by vehicle sensors within an environment can be used to assist in vehicle navigation and obstacle avoidance as the vehicle moves through the environment. For example, cameras and other vehicle sensors may collect image data that vehicles may analyze and use in real-time for navigation, obstacle detection, and avoidance of roadway obstruction. However, the quality of the data collected by the vehicle sensors may become degraded in certain circumstances, including based on environment factors, such as weather conditions. In such cases, the data collected by the vehicle sensors may be suboptimal or even unsuitable for use. This may potentially impact vehicle navigation, obstacle detection, object avoidance, and other vehicle functions that rely on the data.

BRIEF DESCRIPTION OF THE DRAWINGS

The detailed description is described with reference to the accompanying figures. In the figures, the left-most digit(s) of a reference number identify the figure in which the reference number first appears. The same reference numbers in different figures indicate similar or identical items.

DETAILED DESCRIPTION

Figure 1A:
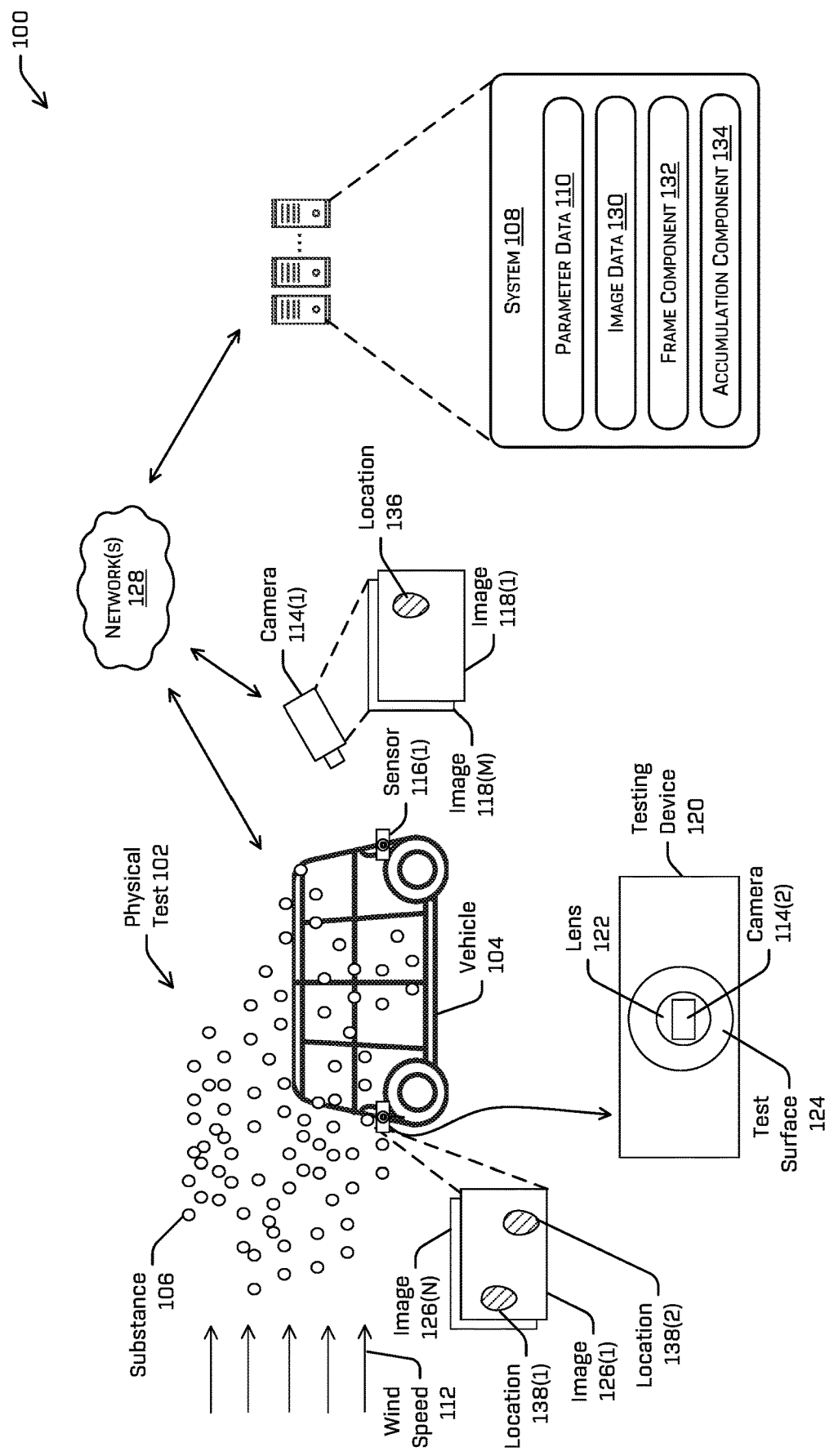
FIG. 1A is an example environment that includes performing a wind tunnel test on a vehicle in order to determine where water accumulates on sensors of the vehicle, in accordance with embodiments of the disclosure.

As discussed above, sensor data captured by sensors on a vehicle can be used to assist in vehicle navigation, object detection, and object avoidance as the vehicle navigates through an environment. However, the quality of the sensor data collected by the sensors may become degraded in certain circumstances, including based on environment factors, such as weather conditions (e.g., rain, snow, etc.). In such cases, the sensor data collected by the sensors may be suboptimal or even unsuitable for use. This may potentially impact the vehicle navigation, obstacle detection, object avoidance, and/or other vehicle functions that rely on the sensor data.

As such, the present application is directed to techniques for performing vehicle sensor degradation testing. For instance, and for a given sensor on the vehicle, a system may initially test the vehicle using testing, such as a wind tunnel test, to determine which portion(s) of the sensor surface are obstructed, such as by the accumulation of water droplets. A control surface may then be created for the sensor, where the control surface includes obstruction(s) located at the portion(s) of the control surface. Using the control surface, the vehicle may navigate around an environment and collect sensor data using the sensor, where the sensor data is analyzed to determine the drivability of the vehicle (e.g., the performance or accuracy of the sensor or perception system) with the control surface attached to the sensor. In some instances, the system may further use the results from the wind tunnel testing to determine an accuracy of computer simulation results (e.g., results of computational fluid dynamics and/or particle flow simulation software), where the computer simulation results indicate where water is predicted to accumulate on the surfaces of the sensor. When the accuracy of the results satisfies a threshold, the system may use simulations to determine drivability of the vehicle when the sensor surface is obstructed.

For example, the vehicle may initially be tested using a test. In some instances, the test includes a wind tunnel test. To perform the test, a sensor on the vehicle may be replaced with a device that includes at least a camera and a test surface that is configured to replicate the actual surface of the sensor. For instance, the test surface may include the same shape and/or material properties of the actual surface of the sensor. The lens of the camera may be configured to focus the camera on the test surface, such that the camera monitors the test surface during the test. Additionally, or alternatively, in some instances, to perform the test, an external camera may capture images of the surface (e.g., which may also be referred to as the "test surface" during the test) of the sensor.

In either instance, the wind tunnel test may apply a substance, such as water droplets, to the vehicle using various testing parameters. The testing parameters may include, but are not limited to, wind speeds, droplet sizes, and/or yaw angles of the vehicle. In some instances, the wind speed used during the test may correspond to a driving speed of the vehicle navigating in an environment. For instance, a wind speed of 55 miles per hour during the test may correspond to a driving speed of 55 miles per hour and, in at least some instances, may be augmented by average storm wind speeds. During the test, the camera may be configured to generate image data representing one or more images depicting characteristics for how the substance interacts with the test surface. The characteristics may include, but are not limited to, how the substance move across the test surface, the portion(s) of the test surface where the substance accumulates, contact angles for the substance onto the test surface, a distribution of the rain droplets on the test surface, and/or any other characteristics.

The system may then analyze the images represented by the image data to identify at least the portion(s) of the test surface where the substance accumulates. In some instances, the system identifies the portion(s) of the test surface where the substance accumulates for the various wind speeds, the various droplet sizes, and/or the various yaw angles. In at least some examples, these determinations may be statistical in nature (e.g., mean, median an/or mode spot size, location, etc., duration of spot (which may be based on size), histograms indicative of portions of the control surface indicative of times the portion of the surface had an accumulation, etc.). The system may then use these determinations to create control surfaces for testing the vehicle when navigating around an environment. For example, the system may use the portion(s) of the test surface that are associated with a given wind speed, given droplet size, and/or given yaw angle to determine which portion(s) of a control surface should include obstruction(s) that resemble the accumulation(s) of the substance. In some instances, the obstruction(s) may include a material that has a refractive index that is approximately equal to the refractive index of the substance. For example, if the substance includes water, the refractive index of the material may be between 1.0 and 1.5 (e.g., approximately 1.3).

The control surface(s) may then be attached to the corresponding sensor(s) of the vehicle. With the control surface(s) attached, the vehicle may navigate around an environment and, while navigating, the sensor(s) of the vehicle may generate sensor data. The system can then analyze the sensor data to determine a drivability of the vehicle when the sensor(s) are degraded. In some examples, the drivability of the vehicle may correspond to the performance of the sensor(s) of the vehicle when the sensors are degraded. For example, the drivability of the vehicle may correspond to the difference between the accuracy of the sensor(s) when the control surface(s) are not attached and the accuracy of the sensor(s) when the control surface(s) are attached.

In some examples, to determine the drivability, and for a sensor, the system may analyze, using a perception component of the vehicle, the sensor data generated by the sensor to determine first statistic(s). In some instances, the first statistic(s) may include, but are not limited to, which object(s) (e.g., pedestrians, vehicles, bicycles, etc.) the perception component detects and/or the location(s) of the detected object(s) when the sensor is degraded. The system may also analyze, using the perception component, sensor data generated by the sensor and/or another sensor to determine second statistic(s). In some instances, the second statistic(s) may include, but are not limited to, which object(s) the perception component detects and/or the location(s) of the detected object(s) when a sensor does not include the control surface (e.g., when the sensor is not degraded). The system may then determine the drivability of the vehicle based on differences between the first statistic(s) and the second statistic(s). For example, the system may determine the drivability of the vehicle based on differences between the identified objects and/or differences on the identified locations of the objects.

For a first example, the system may determine a first number of objects that the perception component detects using the sensor data associated with the sensor that was degraded. The system may also determine a second number of objects that the perception component detects using the sensor data associated with the sensor that was not degraded. The system may then determine the drivability based at least in part on the first number of objects and the second number of objects. For instance, the closer the first number of objects is to the second number of objects, the better the drivability of the vehicle. In this example, the first number of objects may include false positives (e.g., detected objects that were actually not located within the environment) and/or false negatives (e.g., not detecting objects that were actually located within the environment). For instance, the first number of objects could be greater than, equal to, or less than the second number of objects.

For a second example, the system may determine first location(s) of object(s) that the perception component detects using the sensor data that is associated with the sensor that is degraded. The system may also determine second location(s) of object(s) that the perception component detects using the sensor data associated with the sensor that was not degraded. The system may then determine the drivability based at least in part on the first location(s) and the second location(s). For instance, the closer the first location(s) are to the second location(s), the better the drivability of the vehicle. While these are just a couple example processes for determining the drivability of the vehicle using the generated sensor data, in other examples, the system may perform one or more additional and/or alternative processes to determine the drivability.

Examples of determining degradation of a sensor can be found, for example, in U.S. patent application Ser. No. 16/728,910 titled "Sensor Degradation Monitor" and filed Dec. 27, 2019, the entirety of which is herein incorporated by reference.

In some instances, the system may further perform sensor degradation testing using vehicle simulations. For example, the system may use a particle-based simulator (and/or other type of simulator) to analyze how a substance, such as water, interacts with the surfaces of the vehicle and, more specifically, how the substance interacts with the surfaces of the sensors. For example, based on performing a simulation, and for at least a sensor, the system may receive data predicting characteristics for how the substance interacts with the surfaces of the sensors at various wind speeds, various droplet sizes, and/or various yaw angles. The characteristics may include, but are not limited to, how the substance droplets move across the surfaces, the portion(s) of the surfaces where the substance droplets accumulate, contact angles for the substance droplets onto the surfaces, distributions of the substance droplets on the surfaces, and/or any other characteristics, including, but not limited to, those characteristics measured during the test(s) described above. For instance, the data may represent at least an image depicting the portion(s) of the surface of the sensor where the substance accumulates, similar to the testing described above. In some instances, the image may correspond to a mesh of the surface, where the mesh indicates the outer surfaces of the substance droplets located on the surface of the sensor.

In some instances, the system may then determine an accuracy of the simulation using the images captured during the test and the images generated during the simulation. For example, the system may compare an image representing the test surface for a sensor, which was generated using the test, to an image representing a simulated surface for the same sensor. The image representing the simulated surface may include a simulated representation of the surface of the same sensor. In some instances, the system uses images that were generated using the same wind speed, particle size, and/or yaw angle to ensure that the simulation was similar to the test. Of course, though discussed above for illustrative purposes as a single image, any other temporal determinations and/or statistics over a set of images (as discussed above) are contemplated to form the basis of comparison. Based on the comparison, the system may determine a similarity between the portion(s) of the substance that accumulated on the test surface to the portion(s) of the substance that accumulated on the simulated surface. The system may then quantitatively determine the accuracy based at least in part on the similarity and/or use the results to further improve the simulation (e.g., by modifying one or more parameters) in order to create more realistic simulations.

For example, the similarity may correspond to the amount of overlap between the portion(s) of the substance that accumulated on the test surface and the portion(s) of the substance that accumulated on the simulated surface. As described herein, the amount of overlap may correspond to what percentage of the portion(s) of the substance accumulated on the simulated surface correlate to the portion(s) of the substance accumulated on the test surface. The system may determine that there is a greater level of quantitative connection between the test and the simulation when the amount of overlap is high (e.g., 75%, 85%, 95%, etc.). The system may also determine that there is a lower level of quantitative connection when the amount of overlap is low (e.g., 5%, 10%, 15%, 20%, etc.). Furthermore, the system may determine that there is a medium level of quantitative connection when the amount of overlap is between in the middle (e.g., 45%, 50%, 55%, etc.). While this is just one example of analyzing data generated by the test and data generated by the simulation to determine an accuracy of the simulation, in other examples, the system may perform one or more additional and/or alternative analysis.

In other examples, the similarity may correspond to other types of characteristics of the substance. For a first example, the similarity may correspond to how the average substance overage on the simulated surface correlates to the average substance coverage on the test surface from the test. For a second example, the similarity may correspond to how the size and/or shape of simulated droplets on the simulated surface correlates to the size and/or shape of substance droplets on the test surface from the test.

In some instances, the system may perform simulations to test the drivability of the vehicle using the results from the test and/or the simulator. For example, the system may store a library of image data representing non-degraded images (real images generated by the vehicle, simulated images, etc.). To perform a simulation, the system may modify the images, generated by a sensor of the vehicle, to include synthetically generated obstruction(s) that are based on the portion(s) of the surface of the sensor determined using the test and/or the simulator. In some instances, the images are modified using a transformation or filter to overlay at least one separate image layer that contains the synthetically generated obstruction(s). Thus, a real image generated by the sensor of the vehicle may be overlaid with one or more layers of synthetically generated obstructions representing the accumulation of the substance on the sensor surface.

The system may then analyze both the non-degraded images and the degraded images and compare the results to determine the drivability, similar to the analysis described above. For example, the system may analyze, using the perception component of the vehicle, the degraded images to determine which object(s) (e.g., pedestrians, vehicles, bicycles, etc.) the perception component detects and/or the location(s) of the detected object(s) when the sensor is degraded. The system may also analyze, using the perception component, non-degraded images to determine which object(s) the perception component detects and/or the location(s) of the detected object(s) when the sensor is not degraded. The system may then determine the drivability of the vehicle based on a comparison of the detected objects.

For a first example, the system may determine a first number of objects that the perception component detects using the degraded images. The system may also determine a second number of objects that the perception component detects using the non-degraded images. The system may then determine the drivability based at least in part on the first number of objects and the second number of objects. For instance, the closer the first number of objects is to the second number of objects, the better the drivability of the vehicle. In this example, the first number of objects may include false positives (e.g., detected objects that were actually not located within the environment) and/or false negatives (e.g., not detecting objects that were actually located within the environment). For instance, the first number of objects could be greater than, equal to, or less than the second number of objects.

For a second example, the system may determine first location(s) of object(s) that the perception component detects using the degraded images. The system may also determine second location(s) of object(s) that the perception component detects using the non-degraded images. The system may then determine the drivability based at least in part on the first location(s) and the second location(s). For instance, the closer the first location(s) are to the second location(s), the better the drivability of the vehicle. While these are just a couple example processes for determining the drivability of the vehicle using the simulations, in other examples, the system may perform one or more additional and/or alternative processes to determine the drivability.

In some instances, the system may use the data generated using the test, using the environmental driving test that includes the control surface(s), using the simulator, and/or using the simulations to train one or more models associated with the vehicle. For example, the system may use the data to train the one or more models to detect objects, detect locations of objects, and/or classify objects.

For a first example, the system may determine a first number of objects that the perception component detects using the degraded images. The system may also determine a second number of objects that the perception component detects using the non-degraded images. The system may then determine the drivability based at least in part on the first number of objects and the second number of objects. For instance, the closer the first number of objects is to the second number of objects, the better the drivability of the vehicle. While this is just one example of determining drivability of the vehicle using the generated sensor data, in other examples, the system may perform one or more additional and/or alternative analysis to determine the drivability.

Examples of performing simulations on sensors can be found, for example, in U.S. patent application Ser. No. 16/708,019 titled "Perception Error Models" and filed Dec. 9, 2019, the entirety of which is herein incorporated by reference.

By performing the processes described herein, the system is able to better test the drivability of the vehicle when sensors of the vehicle are degraded, such as when it is raining. For example, rather than actually driving the vehicle around an environment when it is raining, where various parameters of the weather (e.g., wind speeds, amount of rain, etc.) can change instantly, the system is able to test the vehicle using a more controlled test. For instance, the system is able to generate various control surfaces for the sensors, where each control surface is associated with given parameters (e.g., wind speed, droplet size, yaw angles, etc.). The system can then use the control surfaces to determine the drivability of the vehicle at set parameters. Similar techniques can be used to test the vehicle in other degraded conditions such as snow, mist, fog, or the like.

The techniques described herein can be implemented in a number of ways. Example implementations are provided below with reference to the following figures. Although discussed in the context of sensors for a vehicle, the methods, apparatuses, and systems described herein can be applied to a variety of sensor systems. Additionally, while the above examples describe testing the vehicle for sensor degradation that is caused by substance, in other examples, the methods, apparatus, and systems described herein can be applied to other types of substances, such as mud, snow, and/or any other substance that may obstruct a sensor.

FIG. 1A is an example environment 100 that includes performing a physical test 102, such as a wind tunnel test, on a vehicle 104 in order to determine where a substance, such as water, accumulates on sensors of the vehicle 104, in accordance with embodiments of the disclosure. For example, during the physical test 102, a substance 106 may be sprayed onto the vehicle 104. In some instances, the substance 106 are sprayed using various nozzles that are associated with parameters for the physical test 102. For example, a system 108 may be configured to set the parameters for the physical test 102, which are represented by parameter data 110. The parameters may include, but are not limited to, a wind speed 112 (e.g., between 15 miles per hours and 60 miles per hour, etc.) at which the substance 106 are sprayed towards the vehicle 104, a size of the substance 106 (e.g., water droplet size), and/or an angel that the substance 106 are sprayed with respect to the vehicle 104 (e.g., a yaw angle, such as between 0 and 15 degrees).

During the physical test 102, cameras 114(1)-(2) (also referred to as "cameras 114") may be configured to capture images of the substance 106 accumulating on surfaces of the sensors. In some instances, a camera 114(1) may be external to the vehicle 104 and positioned such that the focal point of the camera 114(1) includes a surface of a sensor 116(1). For instance, and as shown in the example of FIG. 1A, the camera 114(1) may be capturing images 118(1)-(M) (also referred to as "images 118") representing at least the surface of the sensor 116(1). In some instances, the surface of the sensor 116(1) may be referred to as a "test surface" during the physical test 102.

Figure 1B:
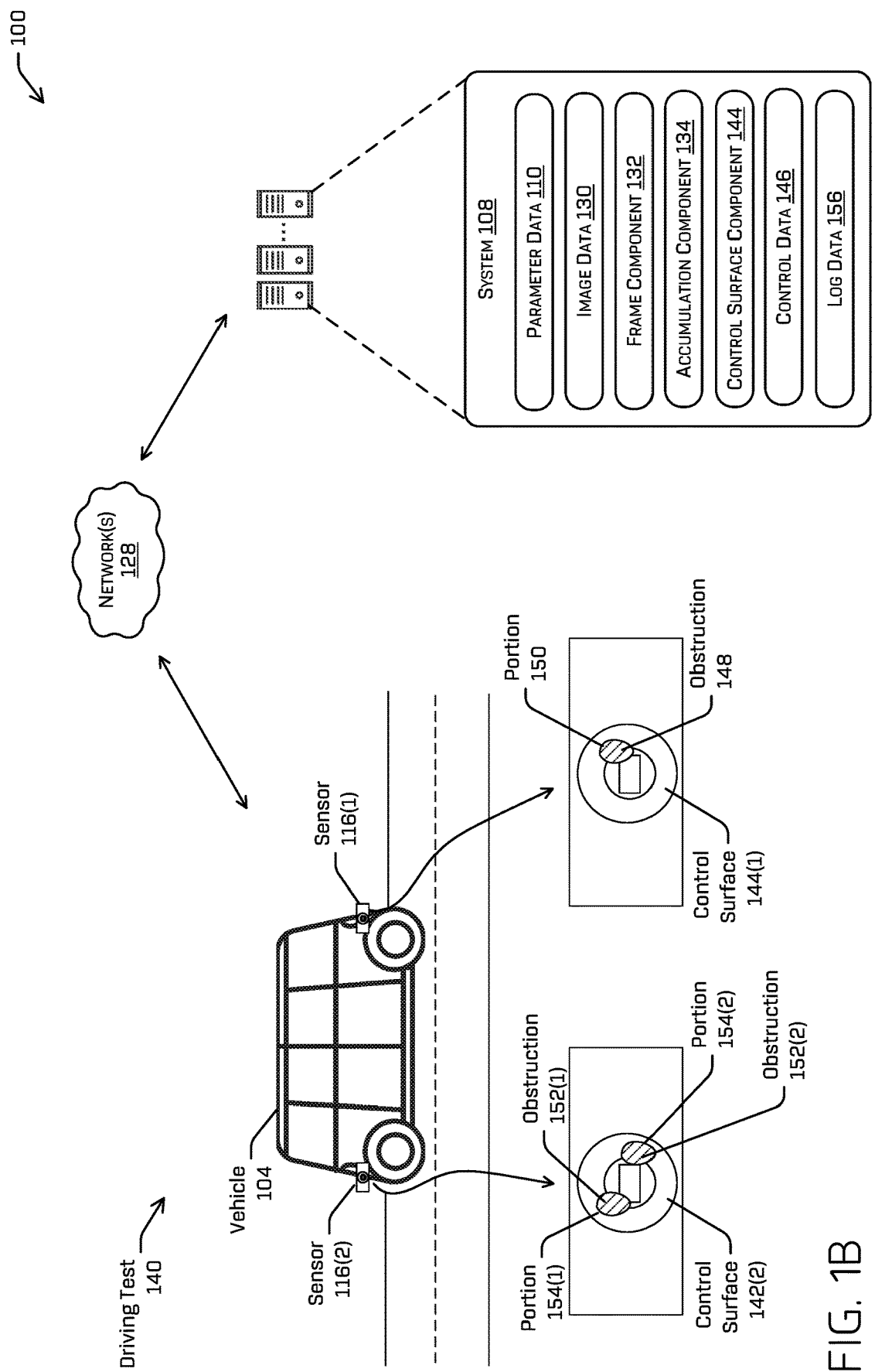
FIG. 1B is an example environment that includes performing driving tests on the vehicle using control surfaces for the sensors of the vehicle, in accordance with embodiments of the disclosure.

Additionally, or alternatively, in some instances, a sensor 116(2) (which is illustrated in the example of FIG. 1B) of the vehicle 104 may be replaced by a testing device 120. The testing device 120 may include a camera 114(2) and a lens 122 (which, in some examples, may be part of the camera 114(2)) that focuses the camera 114(2) on a test surface 124 of the testing device 120. For instance, and as shown in the example of FIG. 1A, the camera 114(2) may be capturing images 126(1)-(N) (also referred to as "images 126") representing at least the test surface 124 of the testing device 120. In some instances, the test surface 124 of the testing device 120 may include a similar shape and/or similar material properties as the actual surface of the sensor 116(2). This way, the substance 106 will accumulate on the test surface 124 of the testing device 120 similarly to how the substance 106 would accumulate on the actual surface of the sensor 116(2). In some instances, the test surface 126 of the testing device 120 may include a similar material as the actual surface of the sensor 116(2). However, in other examples, the test surface 126 of the testing device 120 may include a different material than the material of the actual surface of the sensor 116(2).

The system 108 may receive, over network(s) 128, image data 130 representing the images 118 captured by the camera 114(1) and/or the images 126 captured by the camera 114(2). The system 108 may then analyze the image data 130 in order to determine the surface fluid flow on the surfaces of the sensors 116 and/or determine where the substance 106 accumulate on the surfaces of the sensors 116. For example, the system 108 may initially use a frame component 132 that grabs images (e.g., frames) represented by the image data 130. In some instances, the frame component 132 includes a frame grabber that is configured to grab the images at a given frequency. For example, and if the cameras 114 include a frame rate of 60 frames per second, the frame component 132 may grab every image, every other image, one image per second, one image per minute, and/or the like.

In some instances, the system 108 may associate the images with various parameters of the physical test 102. For example, the system 108 may determine that the image 126(1) was captured by the camera 114(2) when the physical test 102 was operating with first parameters (e.g., the wind speed was a first velocity, the substance size included a first size, and/or the yaw angle included a first angle). As such, the system 108 may associate the image 126(1) with the first parameters. The system 108 may then determine that the image 126(N) was captured by the camera 114(2) when the physical test 102 was operating with second parameters (e.g., the wind speed was a second velocity, the substance size included a second size, and/or the yaw angle included a second angle). As such, the system 108 may associate the image 126(N) with the second parameters.

The system 108 may then analyze the images using an accumulation component 134 to determine the characteristics associated with the substance 106, such where the substance 106 accumulate on the surfaces of the sensors 116. For a first example, the accumulation component 134 may analyze the image data representing the image 118(1) and, based on the analysis, determine that the image 118(1) represents substance 106 at a location 136 of the image 118(1), where the location 136 is associated with outer surfaces of the substance 106. The accumulation component 134 may then determine that the location 136 of the image 118(1) corresponds to a specific portion of the surface of the sensor 116(1). For example, based on the configuration of the camera 114(1), the accumulation component 134 may associate various locations of the images 118 with various portions on the surface of the sensor 116(1). As such, the accumulation component 134 may use the associations to determine the portion of the sensor 116(1).

For a second example, the accumulation component 134 may analyze the image data representing the image 126(1) and, based on the analysis, determine that the image 126(1) represents substance 106 at locations 138(1)-(2) of the image 126(1), where the locations 138(1)-(2) correspond to outer surfaces of the substance 106. The accumulation component 134 may then determine that the locations 138(1)-(2) of the image 126(1) corresponds to specific portions of the test surface 124 of the testing device 120. For example, based on the configuration of the camera 114(2), the accumulation component 134 may associate various locations of the images 126 with various portions on the test surface 124 of the testing device 120. As such, the accumulation component 134 may use the associations to determine the portions of the test surface 124 of the testing device 120.

In some instances, the accumulation component 134 may perform similar processes in order to analyze additional images 118 and 126 that are associated with other parameters for the physical test 102. This way, the system 108 is able to determine how the substance 106 accumulate on the surfaces of the sensors 116 during different weather and/or driving conditions. For example, the system 108 may be able to determine how the substance 106 accumulate on the surfaces of the sensors 116 for different wind speeds, different levels of output (e.g., different levels of rain), different speeds of the vehicle 104, and/or so forth.

FIG. 1B is an example environment that includes performing a driving test 140 on the vehicle 104 using control surfaces 142(1)-(2) (also referred to as "control surfaces 142") for the sensors 116 of the vehicle 104, in accordance with embodiments of the disclosure. For example, the system 108 may use a control surface component 144 to generate control data 146 representing the portions of the surfaces of the sensors 116 where the substance 106 accumulated during the physical test 102. The control data 146 may then be used to create the control surface 142 for the sensors 116.

In some instances, a control surface may include a filter (e.g., plastic) that includes obstruction(s) located at the portion(s) of the filter, where the portion(s) of the filter corresponds to the portion(s) of a surface of a sensor where the substance 106 accumulated during the physical test 102. Additionally, or alternatively, in some instances, a control surface may include the actual surface of a sensor. However, obstruction(s) may be attached to the portion(s) of the surface of the sensor where the substance 106 accumulated during the physical test 102. In some instances, the obstruction(s) may include a material that has a refractive index that is approximately equal to the refractive index of water. For example, and if the substance includes water, the refractive index of the material may be between 1.0 and 1.5 (e.g., 1.333). This way, the obstruction(s) on the control surface can mimic how the substance accumulation would affect the sensor.

For a first example, control data 146 associated with the sensor 116(1) may be used to create the control surface 142(1) for the sensor 116(1). As shown, the control surface 142(1) includes an obstruction 148 located on a portion 150 of the control surface 142(1), where the control data 146 indicates that s substance, such as water, would accumulate on the portion 150 of the surface of the sensor 116(1). In some instances, the control surface 142(1) includes a filter that is placed onto the surface of the sensor 116(1). In other instances, the control surface 142(1) includes the surface of the sensor 116(1) with the obstruction 148 attached to the surface of the sensor 116(1).

For a second example, control data 146 associated with the sensor 116(2) may be used to create the control surface 142(2) for the sensor 116(2). As shown, the control surface 142(2) includes obstructions 152(1)-(2) located on portion 154(1)-(2) of the control surface 142(2), where the control data 146 indicates that a substance, such as water, would accumulate on the portions 154(1)-(2) of the surface of the sensor 116(2). In some instances, the control surface 142(2) includes a filter that is placed onto the surface of the sensor 116(2). In other instances, the control surface 142(2) includes the surface of the sensor 116(2) with the obstructions 152(1)-(2) attached to the surface of the sensor 116(2).

With the control surfaces 142 attached to the sensors 116 of the vehicle 104, the vehicle 104 may perform the driving test 140. For example, the vehicle 104 may navigate around an environment and, while navigating, generate sensor data using the sensors 116 of the vehicle 104. The vehicle 104 may further analyze the sensor data using one or more components (e.g., localization component, perception component, planning component, progress component, etc.) of the vehicle 104. Based on the analysis, the vehicle 104 may determine how to navigate. Additionally, the vehicle 104 may send, over the network(s) 128, log data 156 to the system 108. The system 108 may use the log data 156 to determine a drivability of the vehicle 104 when the sensors 116 are degraded.

In some instances, similar processes may be performed in order to create various control surfaces that are associated with various weather and/or driving conditions. For a first example, control surfaces may be created that are associated with light rain conditions and a vehicle speed of 25 miles per hour. For a second example, control surfaces may be created that are associated with heavy rain conditions and a vehicle speed of 60 miles per hour. As such, the system 108 is able to test the vehicle 104 using different weather and/or driving conditions and in order to determine the drivability of the vehicle 104 for the weather and/or driving conditions.

While the example of FIGS. 1A-1B illustrate generating control surfaces 142 for cameras 114 of the vehicle 104, in other examples, similar processes may be used to generate control surfaces for other types of sensors on the vehicle 104. For example, similar tests may be performed in order to determine how substances accumulate on the surfaces of other sensors of the vehicle 104. Based on the tests, control surfaces may be created and placed on the other surfaces. The vehicle 104 may then perform the driving test 140 using those control surfaces in order to determine the degree to which the substances degrade the sensors.

Figure 2:
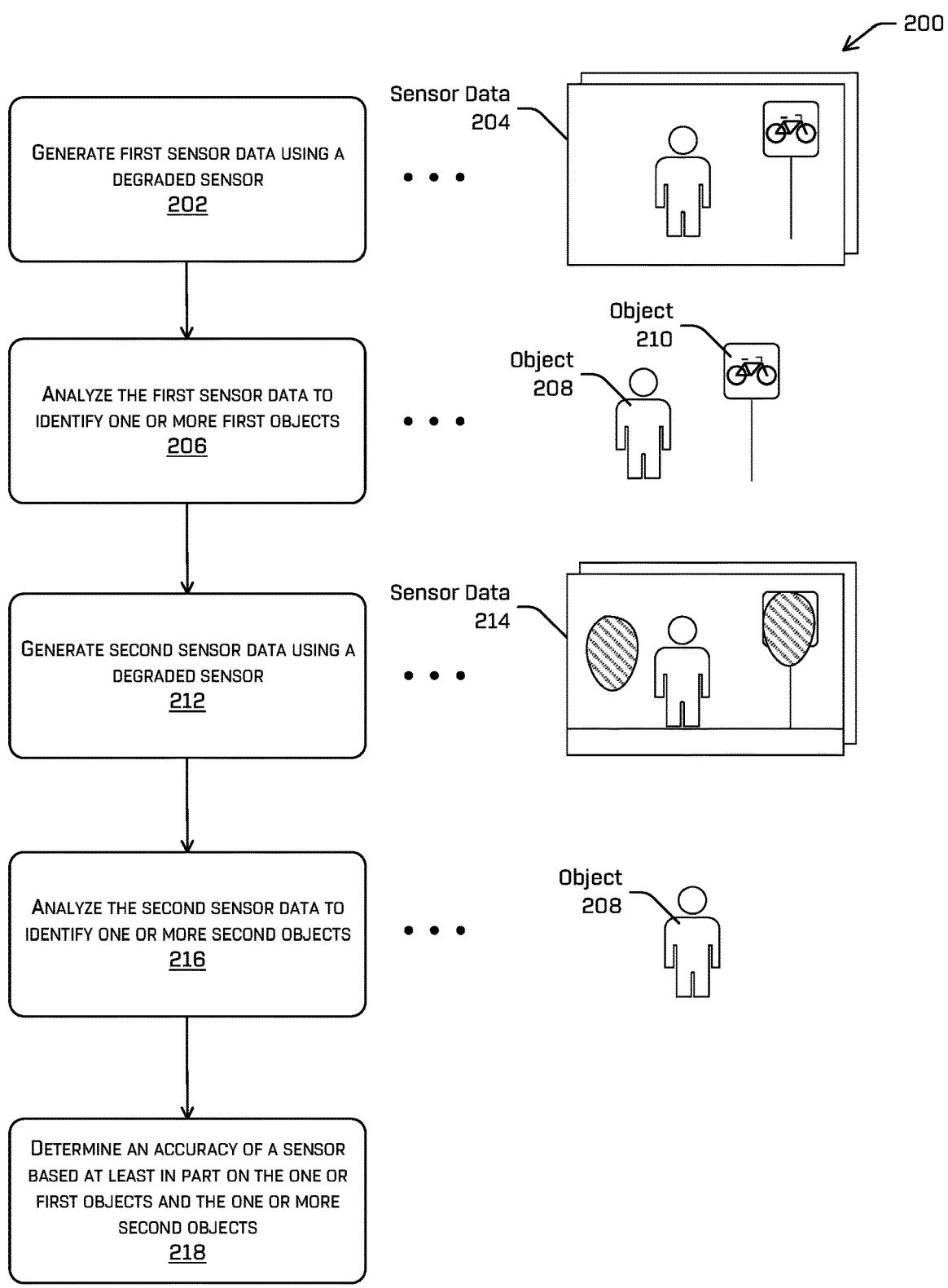
FIG. 2 illustrates a flow diagram of an example process for determining an accuracy of a sensor of a vehicle that includes a control surface, in accordance with embodiments of the disclosure.

FIG. 2 illustrates a flow diagram of an example process for determining a drivability of a vehicle that includes at least one control surface on at least one sensor, in accordance with embodiments of the disclosure. At operation 202, the process 200 may include generating first sensor data using a degraded sensor. For instance, the vehicle 104 may generate the first sensor data 204, such as first image data representing a first image(s), using the sensor 116(2) and/or a second sensor. When generating the first sensor data 204, the sensor 116(2) and/or the second sensor may not be degraded. For example, the sensor 116(2) may not include the control surface 142(2). In some instances, when using another sensor, the other sensor may be similar to the sensor 116(2) and located at a location on the vehicle 104 that is close to the sensor 116(2) (e.g., on the same side, etc.). This way, the sensor 116(2) and the other sensor are generating similar sensor data.

At operation 206, the process 200 may include analyzing the first sensor data to identify one or more objects. For instance, the vehicle 104 may analyze the first sensor data 204 using one or more components (e.g., the perception component) of the vehicle 104. Based on the analysis, the vehicle 104 may identify at least a first object 208 (e.g., a pedestrian) and a second object (e.g., a street sign). Additionally, in some instances, based on the analysis, the vehicle 104 may identify a first location of the first object 208 and a second location of the second object 210.

At operation 212, the process 200 may include generating second sensor data using a degraded sensor. For instance, the vehicle 104 may generate the second sensor data 214, such as second image data representing second image(s), using the sensor 116(2). When generating the second sensor data 214, the sensor 116(2) may include the control surface 142(2). In other words, the sensor 116(2) may be degraded when generating the second sensor data 214.

In some instances, the same sensor generates both the first sensor data 204 and the second sensor data 214. For example, the sensor 116(2) may generate the first sensor data 204 without the control surface 142(2) and then generate the second sensor data 142(2) with the control surface 142(2). In such an example, the vehicle 104 may navigate the same environment when generating the first sensor data 204 and the second sensor data 214 such that the sensor data 204, 214 generated by the sensor 116(2) represents the same objects. For instance, the environment may be a controlled environment where the objects are stationary for the testing.

Additionally, or alternatively, in some instances, the sensor 116(2) may generate the second sensor data 214 using the control surface 142(2) while another sensor (e.g., the sensor 116(1)) generates the first sensor data 204 without a control surface. The other sensor may be placed proximate to the sensor 116(2) such that the field of view of the other sensor at least partially overlaps the field of view of the sensor 116(2). This way, the second sensor data 214 generated by the other sensor should represent at least some of the same objects as the first sensor data 204 generated by the sensor 116(2). When performing such a test, the vehicle 104 (and/or the system 108) may determine which portions of the fields of view overlap so that the vehicle 104 can determine which objects should be detected by both of the sensors.

Additionally, or alternatively, in some instances, the same sensor 116(2) may be used to generate the first sensor data 204 and the second sensor data 214. However, the vehicle 104 may move at a slow enough pace and/or a shutter associated with the sensor 116(2) may be fast enough such that successive images generated by the sensor 116(2) are nearly identical. Additionally, the sensor 116(2) may take the images such that a first image is not distorted (e.g., the first sensor data 204) and a second, successive image is distorted (e.g., the second sensor data 214).

At operation 216, the process 200 may include analyzing the second sensor data to identify one or more second objects. For instance, the vehicle 104 may analyze the second sensor data 214 using the one or more components of the vehicle 104. Based on the analysis, the vehicle 104 may identify the first object 208. Additionally, in some instances, based on the analysis, the vehicle 104 may identify a third location of the first object 208. However, since the control surface 142(2) includes the obstructions 152 that degrade the sensor 116(2), the vehicle 104 may not identify the second object 210 when analyzing the second sensor data 214.

At operation 218, the process 200 may include determining a sensor accuracy based at least in part on the one or more first objects and the one or more second objects. For instance, the system 108 (and/or the vehicle 104) may determine the sensor accuracy of the sensor 116(2) based at least in part on the one or more first objects identified using the first sensor data 204 and the one or more second objects identified using the second sensor data 214. For a first example, if the vehicle 104 is able to detect the same objects with a non-degraded sensor and a degraded sensor, then the system 108 may determine that the sensor accuracy is good. For a second example, and as illustrated in the example of FIG. 2, if the vehicle 104 is not able to detect all of the objects with the degraded sensor, then the system 108 may determine that the sensor accuracy is not good.

In some instances, the sensor accuracy may correspond to the drivability of the vehicle 104 when at least the sensor 116(2) is degraded. In some instances, the system 108 may use one or more additional and/or alternative processes, which are described above, to determine the sensor accuracy. For example, the system 108 may use the identified locations of the objects to determine the sensor accuracy.

In some instances, the vehicle 104 may perform the process 200 of FIG. 2 more than once when determining the accuracy of the sensor. This way, the vehicle 104 (and/or the system 108) can use statistical sampling in order to determine the accuracy of the sensor.

Figure 3:
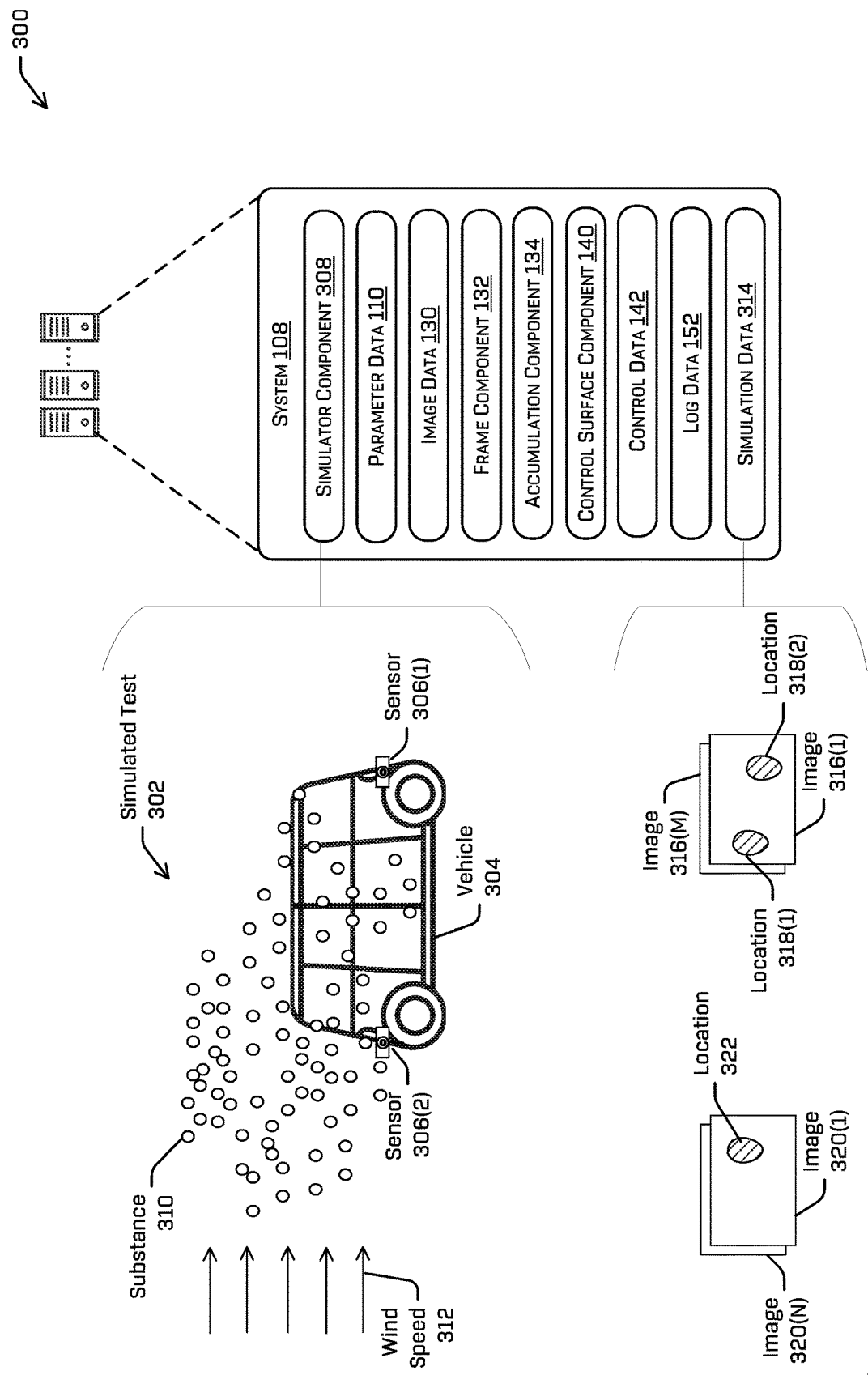
FIG. 3 is an example environment that includes performing a simulated test in order to determine where water accumulates on sensors of the vehicle, in accordance with embodiments of the disclosure.

FIG. 3 is an example environment 300 that includes performing a simulated test 302 on a simulated vehicle 304 in order to determine where a substance, such as water, accumulates on sensors 306(1)-(2) (also referred to as "sensors 306") of the vehicle 304, in accordance with embodiments of the disclosure. In some instances, the system 108 uses a simulator component 308 that generates a particle-based simulator in order to analyze how a substance 310, such as water droplets, interact with the surfaces of the vehicle 304 and, more specifically, the surfaces of the sensors 306. In other instances, the simulator component 308 may generate other types of simulators in order to analyze how the substance 310 interact with the surfaces of the vehicle 304.

As shown, the vehicle 304 may be similar to the vehicle 104 tested using the physical test 102. When performing the simulated test 302, the system 108 may set parameters, which may also be represented by parameter data 110. As discussed above, the parameters may include, but are not limited to, a wind speed 312 (e.g., between 15 miles per hours and 60 miles per hour, etc.) at which the substance 310 are sprayed towards the vehicle 304, a size of the substance 310, and/or an angel that the substance 310 are sprayed with respect to the vehicle 304 (e.g., a yaw angle between 0 and 15 degrees). In some instances, the system 108 uses the same parameters for the simulated test 302 as used during the physical test 102. In other instances, the system 108 uses different parameters for the simulated test 302 as those used during the physical test 102.

The system 108 may receive simulation data 314 representing the results of the simulated test 302. In some instances, the simulation data 314 represents images depicting how the substance 310 accumulated on the surfaces of the sensors 306, similar to the results from the physical test 102. The images may represent meshes of the surfaces of the sensors 306, where the meshes indicate the outer surfaces of the substance 310 located on the surfaces of the sensors 306.

For a first example, the simulation data 314 may represent images 316(1)-(M) depicting locations 318(1)-(2) where the substance 310 accumulated on the surface of the sensor 306(1). In some instances, the images 316(1)-(M) may represent a mesh of the surface of the sensor 306(1), where the mesh indicates the locations 318(1)-(1). For a second examples, the simulation data 314 may represent images 320(1)-(N) depicting a location 322 where the substance 310 accumulated on the surface of the sensor 306(2). In some instances, the images 320(1)-(N) may represent a mesh of the surface of the sensor 306(2), where the mesh indicates the location 322.

Figure 4:
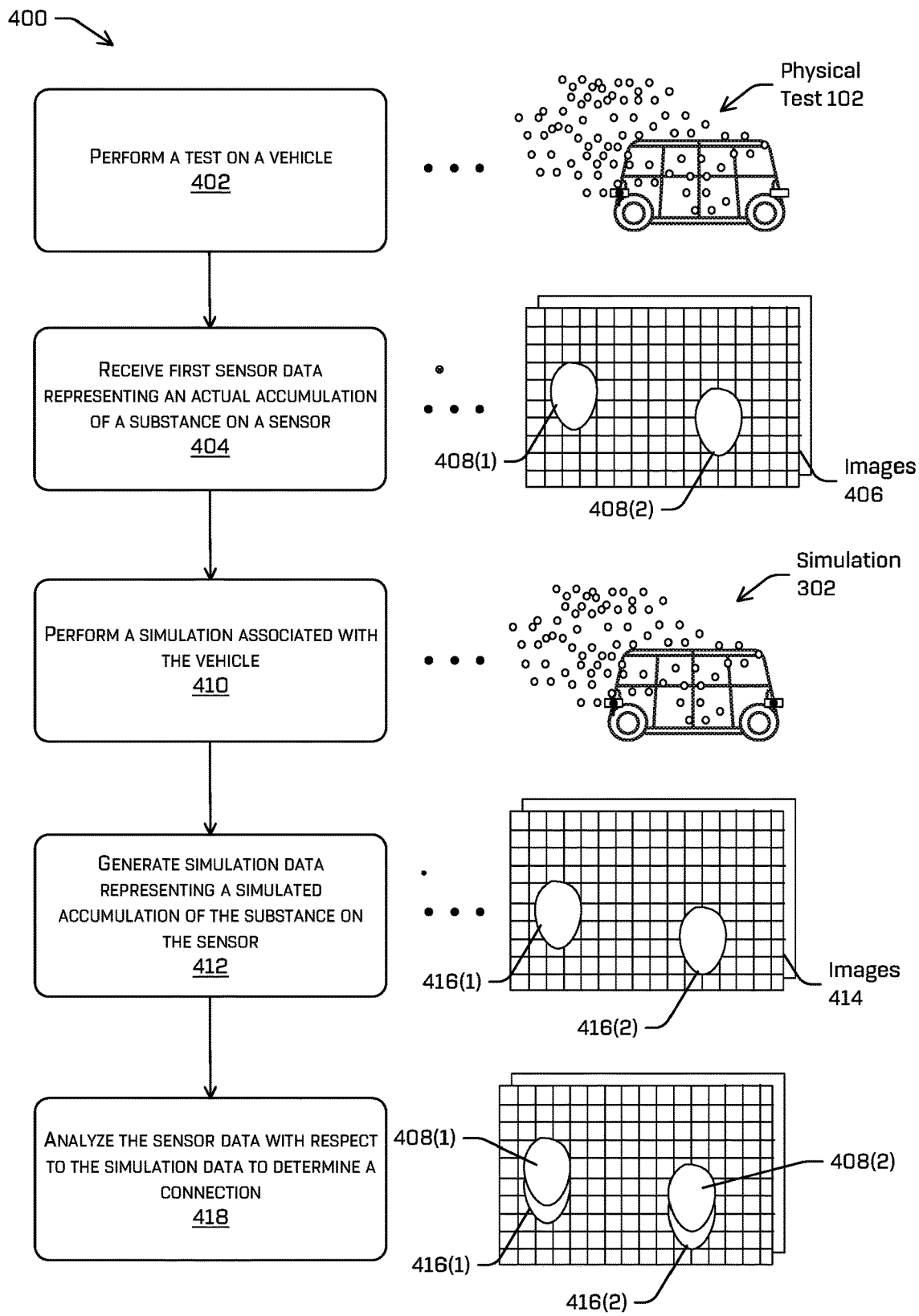
FIG. 4 illustrates a flow diagram of an example process for determining a quantitative connection between a wind tunnel test and a simulated test, in accordance with embodiments of the disclosure.

FIG. 4 illustrates a flow diagram of an example process 400 for determining a quantitative connection between a wind tunnel water test and a simulated water test, in accordance with embodiments of the disclosure. At operation 402, the process 400 may include performing a test on a vehicle. For instance, the physical test 102 may be performed on the vehicle 104 in order to determine how a substance accumulates on sensors of the vehicle 104. During the physical test 102, cameras located on the vehicle 104 and/or external to the vehicle 104 may generate sensor data representing images depicting the surfaces of the sensors.

At operation 404, the process 400 may include receiving sensor data representing an actual accumulation of a substance on a sensor. For instance, the system 108 may receive the sensor data from the vehicle 104 and/or the cameras. In some instances, the sensor data represents first images 406. However, in other instances, the sensor data may include other types of data (e.g., statistical histograms, averages, etc.). The sensor data may be associated with one or more parameters for testing the sensor of the vehicle 104. For example, the first sensor data may be associated with a specified wind speed, a specified size of the substance (e.g., a size of water droplets), and/or a specified angel that the substance is sprayed with respect to the vehicle 104 (e.g., yaw angle). As shown, the first images 406 depict location 408(1)-(2) of the substance on the surface of the sensor.

At operation 410, the process 400 may include performing a simulation associated with the vehicle. For instance, the system 108 may perform the simulated test 302 on the vehicle 304 that includes the simulation of the sensor. The simulated test 302 may include a particle-based simulation to determine how the substance accumulates on at least the sensor of the vehicle 104. To perform the simulated test 302, the system 108 may use the same testing parameters as those that are associated with the first sensor data. In other words, the system 108 may cause the simulated test 302 performed on the vehicle 304 to be as close to the physical test 102 performed on the vehicle 104.

At operation 412, the process 400 may include generating simulation data representing a simulated accumulation of the substance on the sensor. For instance, based on the simulated test 302, the system 108 may generate the simulation data. In some instances, the simulation data represents second images 414. However, in other instances, the simulation data may include other types of data (e.g., statistical histograms, averages, etc.). As shown, the second images 414 may correspond to a mesh of the surface of the sensor. As shown, the second images 414 also depicts two locations 416(1)-(2) of a substance on the surface of the sensor.

At operation 418, the process 400 may include analyzing the sensor data with respect to the simulation data to determine a connection. For instance, the system 108 may compare the first images 406 to the second images 414. In some instances, the comparison may include determining an amount of overlap between the locations 408(1)-(2) represented by the first images 406 and the locations 416(1)-(2) represented by the second images 414. In some instances, the system 108 performs the comparison using the coordinate systems represented by the first images 406 and the second images 414. For example, and using the same coordinate system, the system 108 may determine how many coordinate points that represent the substance from the first images 406 match coordinate points that represent the substance from the second images 414.

In some instances, based on determining that the amount of is equal to or greater than a first threshold, the system 108 may determine that there is a high quantitative connection between the physical test 102 and the simulated test 302. Additionally, based on determining that the amount of overlap is between the first threshold and a second threshold, the system 108 may determine that there is a medium quantitative connection between the physical test 102 and the simulated test 302. Finally, based on determining that the amount of overlap is below the second threshold, the system 108 may determine that there is a low quantitative connection between the physical test 102 and the simulated test 302.

In some instances, such as when the system 108 determines that there is a high quantitative connection between the physical test 102 and the simulated test 302, the system 108 may use the results from the physical test 102 to improve further simulations performed on the vehicle 104. For example, the system 108 may use the results from physical tests 102 in order to determine how to degrade the sensors when performing simulations. In other words, the system 108 is able to use the results from the physical tests 102 in order to perform simulations that better represent how substances accumulate on the sensors of the vehicle 104. Such processes are described in FIG. 5.

Figure 5:
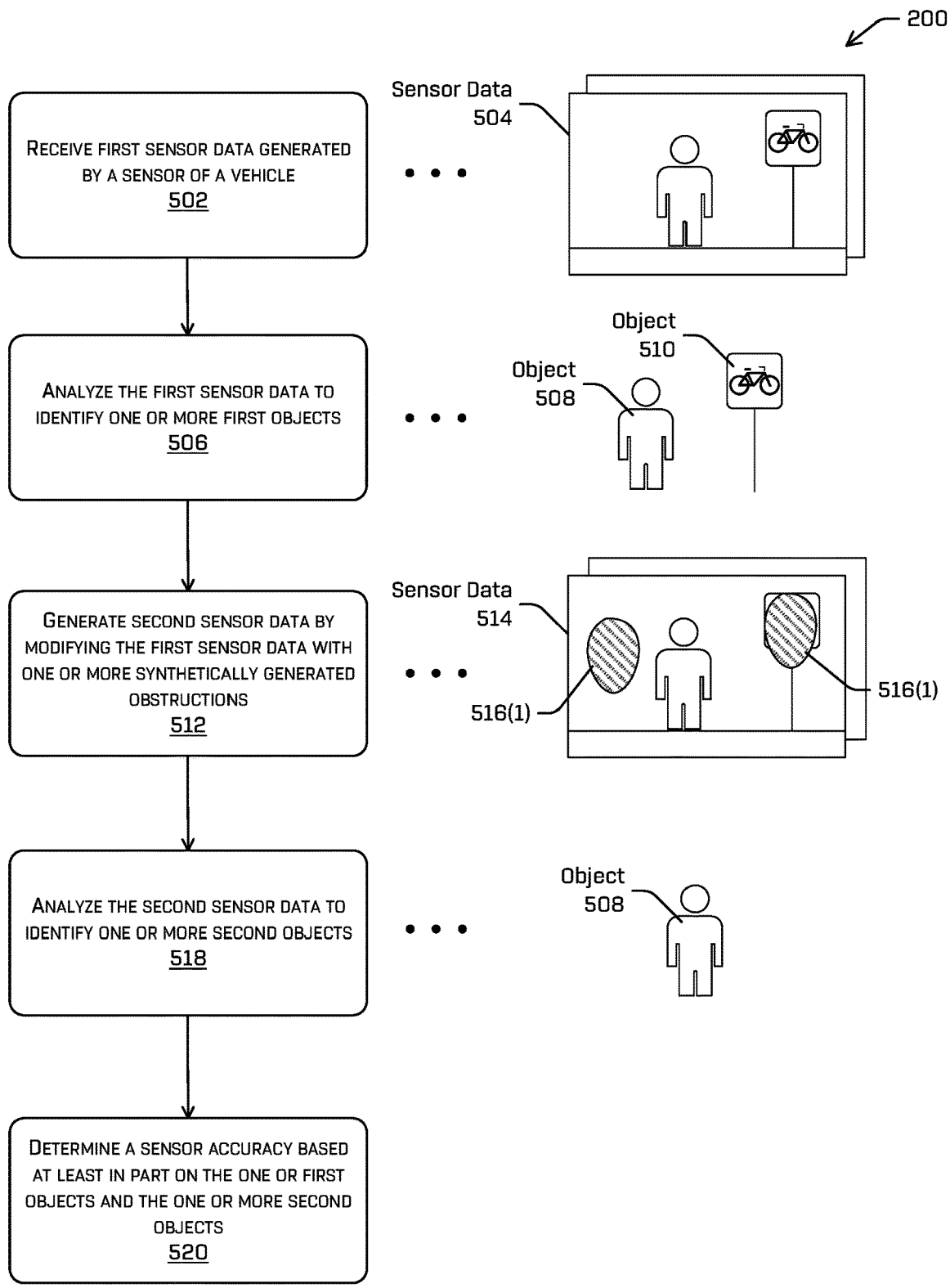
FIG. 5 illustrates a flow diagram of an example process for determining an accuracy of a sensor of a vehicle by simulating an accumulation of water on the sensor of the vehicle, in accordance with embodiments of the disclosure.

FIG. 5 illustrates a flow diagram of an example process 500 for determining an accuracy of a sensor of vehicle by simulating an accumulation of a substance, such as water, on the sensor of the vehicle, in accordance with embodiments of the disclosure. At operation 502, the process 500 may include receiving sensor data generated a sensor of a vehicle. For instance, the vehicle 104 may generate the first sensor data 504, such as image data representing image(s), using a sensor of the vehicle 104. The system 108 may then receive the first sensor data 504 from the vehicle 104. In some instances, the system 108 then stores the first sensor data 504 in a library of sensor data.

At operation 506, the process 500 may include analyzing the first sensor data to identify one or more first objects. For instance, the system 108 may perform a simulation using one or more components of the vehicle 104 in order to analyze the first sensor data 504. In some instances, the simulation may include analyzing the first sensor data 504 using a perception component of the vehicle 104. Based on the simulation, the system 108 may determine that the one or more components identified at least a first object 508 and a second object 510. In some instances, based on the simulation, the system 108 may further determine that the one or more components identified a first location of the first object 508 and a second location of the second object 510.

At operation 512, the process 500 may include generating second sensor data by modifying the first sensor data with one or more synthetically generated obstructions. For instance, the system 108 may generate the second sensor data 514, such as image data representing image(s) with the synthetically generated obstructions 516(1)-(2). In some instances, the first sensor data 504 is modified using a transformation or filter to overlay at least one separate image layer that contains the synthetically generated obstructions 516(1)-(2) onto the image(s) represented by the first image data 504. Thus, a real image generated by the sensor of the vehicle 104 may be overlaid with one or more layers of synthetically generated obstructions 516(1)-(2) representing the accumulation of the substance on the sensor surface.

At operation 518, the process 500 may include analyzing the second sensor data to identify one or more second objects. For instance, the system 108 may again perform a simulation using the one or more components of the vehicle 104 in order to analyze the second sensor data 514. In some instances, the simulation may include analyzing the second sensor data 514 using a perception component of the vehicle 104. Based on the simulation, the system 108 may determine that the one or more components identified at least the first object 508. In some instances, based on the simulation, the system 108 may further determine that the one or more components identified a third location of the first object 508.

At operation 520, the process 500 may include determining a sensor accuracy based at least in part on the one or more first objects and the one or more second objects. For instance, the system 108 may determine the sensor accuracy of the sensor based at least in part on the one or more first objects identified using the first sensor data 504 and the one or more second objects identified using the second sensor data 514. For a first example, if the one or more components able to detect the same objects based on analyzing the first sensor data 504 and the second sensor data 514, then the system 108 may determine that the sensor accuracy is good. For a second example, and as illustrated in the example of FIG. 5, if the one or more components are not able to identify the same objects based on analyzing the first sensor data 504 and the second sensor data 514, then the system 108 may determine that the sensor accuracy is not good.

In some instances, the sensor accuracy may correspond to the drivability of the vehicle 104 when at least the sensor is degraded. In some instances, the system 108 may use one or more additional and/or alternative processes, which are described above, to determine the sensor accuracy. For example, the system 108 may use the identified locations of the objects to determine the sensor accuracy.

Figure 6:
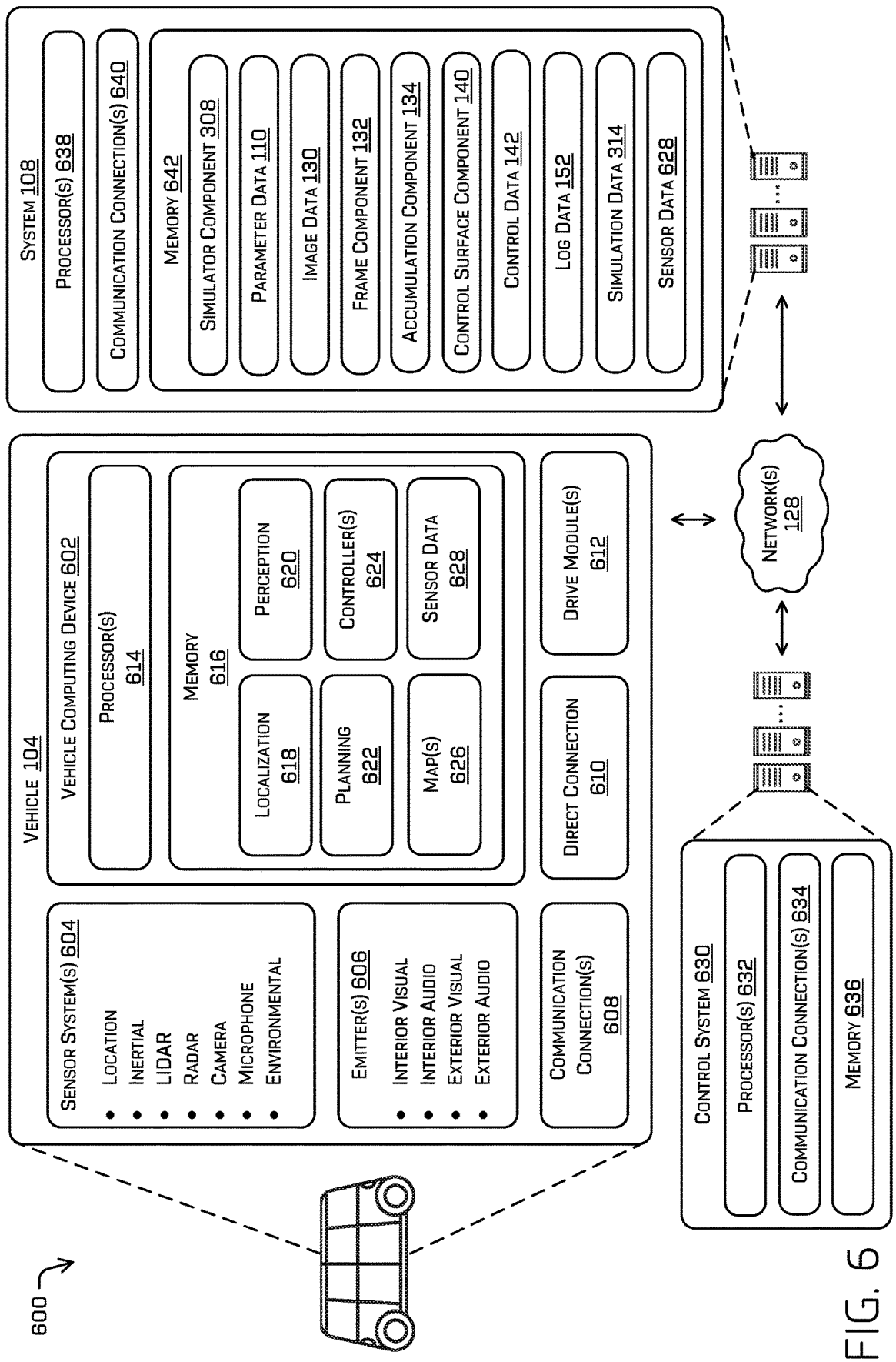
FIG. 6 depicts a block diagram of an example system for implementing the techniques described herein, in accordance with embodiments of the disclosure.

FIG. 6 depicts a block diagram of an example system 600 for implementing the techniques described herein, in accordance with embodiments of the disclosure. In at least one example, the system 600 can include the vehicle 104. The vehicle 104 can include a vehicle computing device 602, one or more sensor systems 604, one or more emitters 606, one or more communication connections 608, at least one direct connection 610, and one or more drive modules 612.

The vehicle computing device 602 can include one or more processors 614 and a memory 616 communicatively coupled with the one or more processors 614. In the illustrated example, the vehicle 104 is an autonomous vehicle. However, the vehicle 104 may be any other type of vehicle (e.g., a manually driven vehicle, a semi-autonomous vehicle, etc.), or any other system having at least an image capture device. In the illustrated example, the memory 616 of the vehicle computing device 602 stores a localization component 618, a perception component 620, a planning component 622, one or more system controllers 624, and one or more maps 626. Though depicted in FIG. 6 as residing in the memory 616 for illustrative purposes, it is contemplated that the localization component 618, the perception component 620, the planning component 622, the system controller(s) 624, and/or the map(s) 626 can additionally, or alternatively, be accessible to the vehicle 104 (e.g., stored on, or otherwise accessible by, memory remote from the vehicle 104).

In at least one example, the localization component 618 can include functionality to receive sensor data 628 from the sensor system(s) 604 and to determine a position and/or orientation of the vehicle 104 (e.g., one or more of an x-, y-, z-position, roll, pitch, or yaw). For example, the localization component 618 can include and/or request/receive a map of an environment and can continuously determine a location and/or orientation of the vehicle 104 within the map. In some instances, the localization component 618 can utilize SLAM (simultaneous localization and mapping), CLAMS (calibration, localization and mapping, simultaneously), relative SLAM, bundle adjustment, non-linear least squares optimization, or the like to receive image data, lidar data, radar data, IMU data, GPS data, wheel encoder data, and the like to accurately determine a location of the vehicle 104. In some instances, the localization component 618 can provide data to various components of the vehicle 104 to determine an initial position of the vehicle 104 for generating a candidate trajectory, as discussed herein.

In some instances, the perception component 620 can include functionality to perform object detection, segmentation, and/or classification. In some instances, the perception component 620 can provide processed sensor data 628 that indicates a presence of an object that is proximate to the vehicle 104 and/or a classification of the object as an object type (e.g., car, pedestrian, cyclist, animal, building, tree, road surface, curb, sidewalk, unknown, etc.). In additional and/or alternative examples, the perception component 620 can provide processed sensor data 628 that indicates one or more characteristics associated with a detected object and/or the environment in which the object is positioned. In some instances, characteristics associated with an object can include, but are not limited to, an x-position (global position), a y-position (global position), a z-position (global position), an orientation (e.g., a roll, pitch, yaw), an object type (e.g., a classification), a velocity of the object, an acceleration of the object, an extent of the object (size), etc. Characteristics associated with the environment can include, but are not limited to, a presence of another object in the environment, a state of another object in the environment, a time of day, a day of a week, a season, a weather condition, an indication of darkness/light, etc.

In general, the planning component 622 can determine a path for the vehicle 104 to follow to traverse through an environment. For example, the planning component 622 can determine various routes and trajectories and various levels of detail. For example, the planning component 622 can determine a route to travel from a first location (e.g., a current location) to a second location (e.g., a target location). For the purpose of this discussion, a route can be a sequence of waypoints for travelling between two locations. As non-limiting examples, waypoints include streets, intersections, global positioning system (GPS) coordinates, etc. Further, the planning component 622 can generate an instruction for guiding the vehicle 104 along at least a portion of the route from the first location to the second location. In at least one example, the planning component 622 can determine how to guide the vehicle 104 from a first waypoint in the sequence of waypoints to a second waypoint in the sequence of waypoints. In some instances, the instruction can be a trajectory, or a portion of a trajectory. In some instances, multiple trajectories can be substantially simultaneously generated (e.g., within technical tolerances) in accordance with a receding horizon technique, wherein one of the multiple trajectories is selected for the vehicle 104 to navigate.

In at least one example, the planning component 622 can determine a pickup location associated with a location. As used herein, a pickup location can be a specific location (e.g., a parking space, a loading zone, a portion of a ground surface, etc.) within a threshold distance of a location (e.g., an address or location associated with a dispatch request) where the vehicle 104 can stop to pick up a passenger. In at least one example, the planning component 622 can determine a pickup location based at least in part on determining a user identity (e.g., determined via image recognition or received as an indication from a user device, as discussed herein). Arrival at a pickup location, arrival at a destination location, entry of the vehicle by a passenger, and receipt of a "start ride" command are additional examples of events that may be used for event-based data logging.

In at least one example, the vehicle computing device 602 can include the system controller(s) 624, which can be configured to control steering, propulsion, braking, safety, emitters, communication, and other systems of the vehicle 104. These system controller(s) 624 can communicate with and/or control corresponding systems of the drive module(s) 612 and/or other components of the vehicle 104.

The memory 616 can further include the map(s) 626 that can be used by the vehicle 104 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment and can be loaded into working memory as needed. In at least one example, the map(s) 626 can include at least one map (e.g., images and/or a mesh). In some example, the vehicle 104 can be controlled based at least in part on the map(s) 626. That is, the map(s) 626 can be used in connection with the localization component 618, the perception component 620, and/or the planning component 622 to determine a location of the vehicle 104, identify entities in an environment, and/or generate routes and/or trajectories to navigate within an environment.

In some instances, aspects of some or all of the components discussed herein can include any models, algorithms, and/or machine learning algorithms. For example, in some instances, the components in the memory 616 can be implemented as a neural network. As described herein, an exemplary neural network is a biologically inspired algorithm which passes input data through a series of connected layers to produce an output. Each layer in a neural network can also comprise another neural network, or can comprise any number of layers (whether convolutional or not). As can be understood in the context of this disclosure, a neural network can utilize machine learning, which can refer to a broad class of such algorithms in which an output is generated based at least in part on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 2 (ID2), Chi-squared automatic interaction detection (CHAD), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet70, ResNet101, VGG, DenseNet, PointNet, and the like.

As discussed above, in at least one example, the sensor system(s) 604 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), cameras (e.g., RGB, IR, intensity, depth, time of flight, etc.), microphones, wheel encoders, environment sensors (e.g., temperature sensors, humidity sensors, light sensors, pressure sensors, etc.), etc. The sensor system(s) 604 can include multiple instances of each of these or other types of sensors. For instance, the lidar sensors can include individual lidar sensors located at the corners, front, back, sides, and/or top of the vehicle 104. As another example, the camera sensors can include multiple cameras disposed at various locations about the exterior and/or interior of the vehicle 104. The sensor system(s) 604 can provide input to the vehicle computing device 602. Additionally or alternatively, the sensor system(s) 604 can send the sensor data 628, via the one or more network(s) 128, to a control system 630 at a particular frequency, after a lapse of a predetermined period of time, upon occurrence of one or more conditions, in near real-time, etc.

The vehicle 104 can also include the emitter(s) 606 for emitting light and/or sound, as described above. The emitter(s) 606 in this example include interior audio and visual emitters to communicate with passengers of the vehicle 104. By way of example and not limitation, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitter(s) 606 in this example also include exterior emitters. By way of example and not limitation, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 104 can also include the communication component(s) 608 that enable communication between the vehicle 104 and one or more other local or remote computing device(s). For instance, the communication connection(s) 608 can facilitate communication with other local computing device(s) on the vehicle 104 and/or the drive module(s) 612. Also, the communication connection(s) 608 can allow the vehicle 104 to communicate with other nearby computing device(s) (e.g., other nearby vehicles, traffic signals, etc.). The communications connection(s) 608 also enable the vehicle 104 to communicate with the remote teleoperations computing devices or other remote services.

The communications connection(s) 608 can include physical and/or logical interfaces for connecting the vehicle computing device 602 to another computing device or a network, such as network(s) 128. For example, the communications connection(s) 608 can enable Wi-Fi-based communication such as via frequencies defined by the IEEE 802.11 standards, short range wireless frequencies such as Bluetooth®, cellular communication (e.g., 2G, 2G, 4G, 4G LTE, 5G, etc.) or any suitable wired or wireless communications protocol that enables the respective computing device to interface with the other computing device(s).

In at least one example, the vehicle 104 can include one or more drive modules 612. In some instances, the vehicle 104 can have a single drive module 612. In at least one example, if the vehicle 104 has multiple drive modules 612, individual drive modules 612 can be positioned on opposite ends of the vehicle 104 (e.g., the front and the rear, etc.). In at least one example, the drive module(s) 612 can include one or more sensor systems to detect conditions of the drive module(s) 612 and/or the surroundings of the vehicle 104. By way of example and not limitation, the sensor system(s) 604 can include one or more wheel encoders (e.g., rotary encoders) to sense rotation of the wheels of the drive modules, inertial sensors (e.g., inertial measurement units, accelerometers, gyroscopes, magnetometers, etc.) to measure orientation and acceleration of the drive module, cameras or other image sensors, ultrasonic sensors to acoustically detect entities in the surroundings of the drive module, lidar sensors, radar sensors, etc. Some sensors, such as the wheel encoders can be unique to the drive module(s) 612. In some cases, the sensor system(s) 604 on the drive module(s) 612 can overlap or supplement corresponding systems of the vehicle 104 (e.g., sensor system(s) 604).

The drive module(s) 612 can include many of the vehicle systems, including a high voltage battery, a motor to propel the vehicle 104, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive module(s) 612 can include a drive module controller which can receive and preprocess the sensor data 628 from the sensor system(s) 604 and to control operation of the various vehicle systems. In some instances, the drive module controller can include one or more processors and memory communicatively coupled with the one or more processors. The memory can store one or more modules to perform various functionalities of the drive module(s) 612. Furthermore, the drive module(s) 612 also include one or more communication connection(s) that enable communication by the respective drive module with one or more other local or remote computing device(s).

In at least one example, the direct connection 610 can provide a physical interface to couple the one or more drive module(s) 612 with the body of the vehicle 104. For example, the direct connection 610 can allow the transfer of energy, fluids, air, data, etc. between the drive module(s) 612 and the vehicle 104. In some instances, the direct connection 610 can further releasably secure the drive module(s) 612 to the body of the vehicle 104.

As further illustrated in FIG. 6, the control system 630 can include processor(s) 632, communication connection(s) 634, and memory 636. Additionally, the system 108 can include processor(s) 638, communication connection(s) 640, and memory 642. The processor(s) 614 of the vehicle 104, the processor(s) 632 of the control system 630, and/or the processor(s) 638 of the system 108 (and/or other processor(s) described herein) can be any suitable processor capable of executing instructions to process data and perform operations as described herein. By way of example and not limitation, the processor(s) 614, the processor(s) 632, and the processor(s) 638 can comprise one or more Central Processing Units (CPUs), Graphics Processing Units (GPUs), or any other device or portion of a device that processes electronic data to transform that electronic data into other electronic data that can be stored in registers and/or memory. In some instances, integrated circuits (e.g., ASICs, etc.), gate arrays (e.g., FPGAs, etc.), and other hardware devices can also be considered processors in so far as they are configured to implement encoded instructions.

The memory 616, the memory 636, and the memory 642 (and/or other memory described herein) are examples of non-transitory computer-readable media. The memory 616, the memory 636, and the memory 642 can store an operating system and one or more software applications, instructions, programs, and/or data to implement the methods described herein and the functions attributed to the various systems. In various implementations, the memory can be implemented using any suitable memory technology, such as static random access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

It should be noted that while FIG. 6 is illustrated as a distributed system, in alternative examples, components of the system 108 can be associated with the vehicle 104 and/or the control system 630 and/or components of the vehicle 104 can be associated with the system 108 and/or the control system 630. That is, the vehicle 104 can perform one or more of the functions associated with the system 108 and/or the control system 630, and the system 108 can perform one or more of the functions associated with the vehicle 104 and/or the control system 630.

Figure 7:
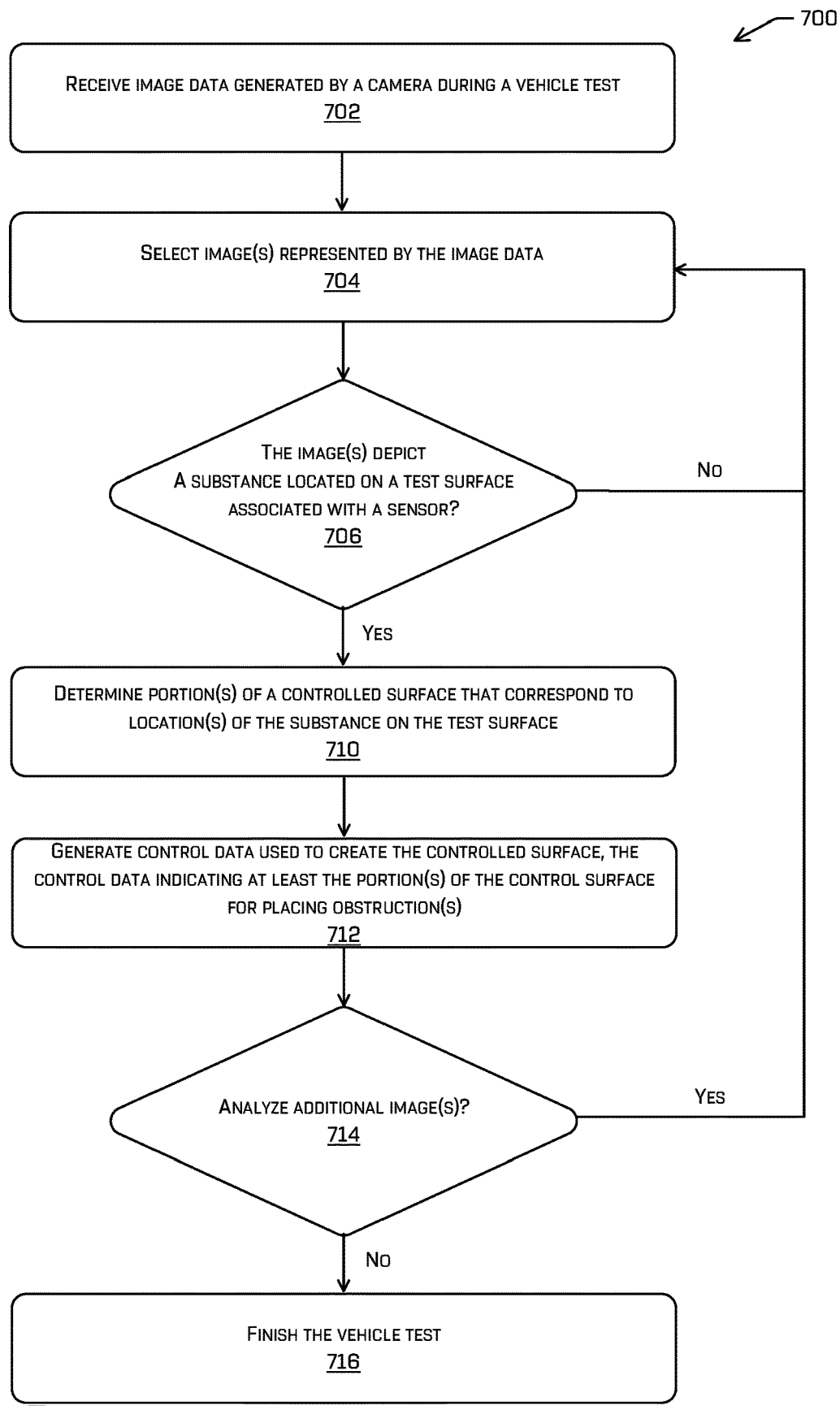
FIG. 7 illustrates a flow diagram of an example process for analyzing sensor data generated during a wind tunnel test in order to design control surfaces for sensors of a vehicle, in accordance with embodiments of the disclosure.

FIG. 7 illustrates a flow diagram of an example process 700 for analyzing sensor data generated during a wind tunnel test in order to generate data that may be used to create control surfaces for sensors of a vehicle, in accordance with embodiments of the disclosure. At operation 702, the process 700 may include receiving image data generated by a camera during a vehicle test. For instance, the system 108 may receive the image data from the vehicle 104 and/or the camera. The vehicle test may include a wind tunnel test to determine how a substance, such as water, accumulates on one or more surfaces of one or more sensors of the vehicle 104. In some instances, the camera is located within a device that replaces the sensor on the vehicle 104. In other instances, the camera is external to the vehicle 104 and configured to monitor the surface of the sensor.

At operation 704, the process 700 may include selecting image(s) represented by the image data. For instance, the system 108 may use a frame grabber to grab images (e.g., frames) represented by the image data. The system 108 may then select the image(s) from the images. In some instances, the image(s) may be associated with at least one parameter used during the vehicle test. For instance, the image(s) may be associated with a wind speed of the vehicle test, a size of the substance (e.g., rain droplet size), and/or a yaw angle of the vehicle 104 during the vehicle test.

In some instances, the system 108 selects the image(s) when there is a steady state. For example, the system 108 may select image(s) when the image(s) continue to depict accumulation(s) that have been located on the surface of the sensor for a given period of time (e.g., ten seconds, thirty seconds, one minute, etc.). This may indicate a steady state of the surface of the sensor.

At 706, the process 700 may include determining if the image(s) represent a substance located on a test surface associated with the sensor. For instance, the system 108 may determine whether the image(s) depict the substance located on the test surface associated with the sensor. In some instances, the substance may include water droplets that have accumulated on the test surface associated with the sensor. However, in other instances, the substance may include snow, dirt, and/or any other substance that may accumulate on surfaces of sensors. In some instances, such as when the camera is included in the device that replaces the sensor, the test surface may include the outer surface of the device that replicates the actual surface of the sensor. In other instances, such as when the camera is external to the vehicle 104, the test surface may include the actual surface of the sensor.

If, at operation 706, it is determined that the image(s) do not depict the substance located on the test surface associated with the sensor, then the process 700 may repeat back at operation 704 to select new image(s). However, if, at operation 706, it is determined that the image(s) depict the substance located on the test surface associated with the sensor, then at operation 710, the process 700 may include determining portion(s) of a control surface that correspond to location(s) of the substance of the test surface. For instance, the system 108 may use the location(s) of the substance on the test surface to determine the portion(s) of the control surface. In some instances, the control surface includes a similar shape as the test surface and as such, the portion(s) of the control surface may correspond to the location(s) of the substance on the test surface.

At operation 712, the process 700 may include generating control data used to create the control surface, the control data indicating at least the portion(s) of the control surface for placing obstruction(s). For instance, the system 108 may generate the control data, where the control data indicates the portion(s) on the control surface for placing obstruction(s) that replicate the location(s) of the substance. In some instances, the control surface is the actual surface of the sensor with the obstruction(s) attached to the surface. In other instances, the control surface is a filter that includes the obstruction(s), where the filter is placed on the surface of the filter. In either instance, the obstruction(s) include a material that has a refractive index that is approximately equal (e.g., within 5%, within 10%, etc.) to a refractive index of the substance.

At operation 714, the process 700 may include determining if additional image(s) should be analyzed. For instance, the system 108 may determine whether to analyze other image(s) that is associated with at least one different parameter of the vehicle test. If, at operation 714, it is determined that the additional image(s) should be analyzed, then the process 700 may repeat back at operation 704 to select the additional image(s). However, if, at operation 714, it is determined that the additional image(s) should not be analyzed, then at operation 716, the process 700 may include finishing the vehicle test. For instance, the system 108 may determine to finish the vehicle test.

Figure 8:
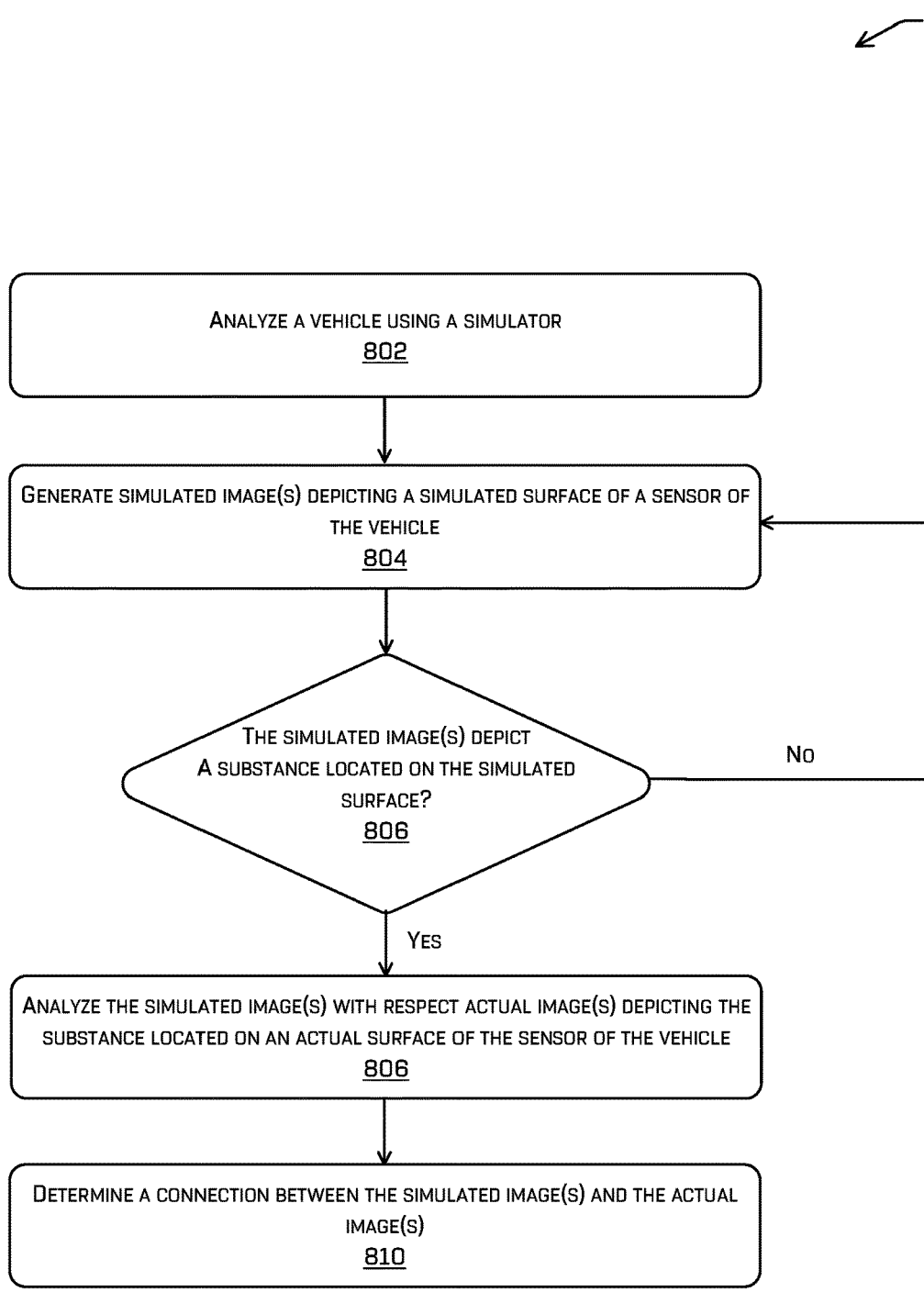
FIG. 8 illustrates a flow diagram of an example process for quantitatively determining an accuracy of a simulation performed to determine how a substance accumulates on sensors of a vehicle, in accordance with embodiments of the disclosure.

FIG. 8 illustrates a flow diagram of an example process 800 for quantitatively determining an accuracy of a simulation performed to determine how a substance accumulates on sensors of a vehicle, in accordance with embodiments of the disclosure. At operation 802, the process 800 may include analyzing a vehicle using a simulator. For instance, the system 108 may analyze the vehicle 304, which represents a simulation of the vehicle 104, using the simulator. The simulator may be used to determine how a substance (e.g., water, snow, mud, etc.) accumulates on the surfaces of the sensors of the vehicle 104. For example, the simulator may include a particle-based simulator.

At operation 804, the process 800 may include generating simulated image(s) depicting a simulated surface of a sensor of the vehicle. For instance, based on analyzing the vehicle 104 using the simulator, the system 108 may generate the simulated image(s) of the simulated surface. In some instances, the simulated image(s) may be associated with one or more parameters of the simulator. For instance, the simulated image may be associated with a wind speed of the simulation, a substance size (e.g., rain droplet size of the simulation), and/or a yaw angle of the vehicle 104 during the simulation.

At operation 806, the process 800 may include determining if the simulated image(s) depict a substance located on the simulated surface. For instance, the system 108 may analyze the simulated image(s) to determine if the simulated image(s) depict the substance located on the simulated surface. In some instances, the substance may include water droplets that have accumulated on the simulated surface associated with the sensor. However, in other instances, the substance may include snow, dirt, and/or any other substance that may accumulate on surfaces of sensors.

If, at operation 806, it is determined that the simulated image(s) do not depict the substance located on the simulated surface, then the process 800 may repeat back at 804 to generate new simulated image(s). For instance, if the system 108 determines that the simulated image(s) do not depict any substance located on the simulated surface, then the system 108 may determine that the substance did not accumulate on the simulated surface.

However, if, at operation 806, it is determined that the simulated image(s) depict the substance located on the simulated surface, then at operation 808, the process 800 may include analyzing the simulated image(s) with respect to actual image(s) depicting the substance located on an actual surface of the sensor of the vehicle. For instance, the system 108 may compare the simulated image(s) to the actual image(s) depicting the substance, where the actual image(s) were generated during a physical test of the vehicle 104. In some instances, based on the comparison, the system 108 may determine the amount of overlap between the location(s) of the substance depicted by the simulated image(s) and the location(s) of the substance depicted by the actual image(s). Additionally, or alternatively, in some instances, based on the comparison, the system 108 may determine the difference between the average spot size, min/max spot size, average spot location, average spot duration, spot duration vs spot size, and/or most common location between the substance depicted by the simulated image(s) and the substance depicted by the actual image(s).

At operation 810, the process 800 may include determining a connection between the simulated image(s) and the actual image(s). For instance, based on the analysis, the system 108 may determine a quantitative connection between the simulated image(s) and the actual image(s). In some instances, the quantitative connection may be based on the amount of overlap between the location(s) of the substance depicted by the simulated image and the location(s) of the substance depicted by the actual image. For example, the greater the amount of overlap, the greater the quantitative connection between the simulated image and the actual image. Additionally, or alternatively, in some instances, the quantitative connection may be based on the amount of overlap between the average spot size, min/max spot size, average spot location, average spot duration, spot duration vs spot size, and/or most common location.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X, Y or Z," unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted, or executed out of order from that shown or discussed, including substantially synchronously, in reverse order, with additional operations, or omitting operations, depending on the functionality involved as would be understood by those skilled in the art.

Many variations and modifications may be made to the above-described examples, the elements of which are to be understood as being among other acceptable examples. All such modifications and variations are intended to be included herein within the scope of this disclosure and protected by the following claims.

Example Clauses

A: One or more computing devices comprising: one or more processors; and one or more computer-readable media storing instructions that, when executed by the one or more processors, cause the one or more computing devices to perform operations comprising: receiving image data associated with a vehicle during a wind tunnel test, the image data comprising an image depicting a test surface associated with a sensor of the vehicle; determining a characteristic associated with water accumulated on the test surface during the wind tunnel test; determining, based at least in part on the characteristic, a control surface; receiving, from the sensor, sensor data, the sensor data being distorted, at least in part, by the control surface; determining a level of degradation of the sensor data; and controlling the vehicle based at least in part on the level of degradation.

B: The one or more computing devices as recited in paragraph A, the operations further comprising determining a parameter under which the wind tunnel test was performed, the parameter comprising at least one of: a vehicle speed; a droplet size; or a yaw angle associated with the vehicle, wherein the control surface is determined further based at least in part on the parameter.

C: The one or more computing devices as recited in paragraph A or paragraph B, wherein: the control surface comprises an artificial raindrop adhered to an external surface of the control surface, the artificial raindrop having an index of refraction between 1.2 and 1.4, having a size determined based at least in part on the characteristic, and a location on the control surface based at least in part on the characteristic, and the control surface is placed in a path of the sensor to cause the sensor data to be distorted.

D: The one or more computing devices as recited in any of paragraphs A-C, wherein: the image data comprises a plurality of first images captured by the sensor, the sensor data comprises a plurality of second images, and the operations further comprise: determining a first statistic associated with the image data; determining a second statistic associated with the sensor data; and determining a difference between the first statistic and the second statistic, wherein the first statistic and the second statistic comprise one or more of: an average location of an accumulation on the test surface, an average size of the accumulation, or an average duration the accumulation presents on the test surface.

E: The one or more computing devices as recited in any of paragraphs A-D, wherein: the control surface comprises a simulated raindrop, the simulated raindrop having a size determined based at least in part on the characteristic, and a location on the control surface based at least in part on the surface, the sensor data comprises additional image data, and the additional image data is distorted based at least in part on the simulated raindrop.

F: A method comprising: receiving image data generated by a camera associated with a vehicle during a test, the image data representing at least an image depicting a test surface associated with a sensor of the vehicle; determining an accumulation of a substance on a portion of the test surface; determining a portion of a control surface associated with the sensor that corresponds to the accumulation on the portion of the test surface; and generating control data for creating the control surface, the control data indicating at least the portion of the control surface.

G: The method as recited in paragraph F, wherein the control surface comprises an artificial material adhered to an external surface of the control surface, the artificial material including at least one of: an index of refraction that is approximately equal to an index of refraction of the substance; a size that is based at least in part on the accumulation; or a location on the control surface that is based at least in part on the accumulation.

H: The method as recited in paragraph F or paragraph G, further comprising determining a parameter associated with the test, the parameter comprising at least one of: a vehicle speed; a droplet size; or a yaw angle associated with the vehicle, wherein generating the control data is based at least in part on the parameter.

I: The method as recited in any of paragraphs F-H, further comprising: receiving sensor data from the sensor, the sensor data being distorted, at least in part, by the control surface; and determining a level of degradation of the sensor data.

J: The method as recited in any of paragraphs F-I, wherein determining the level of degradation of the sensor data comprises at least: determining a first statistic associated with the sensor data, the sensor data representing one or more objects; determining a second statistic associated with additional sensor data, the additional sensor data representing the one or more objects; and determining a difference between the first statistic and the second statistic.

K: The method as recited in any of paragraphs F-J, further comprising: receiving first sensor data generated by the sensor; generating second sensor data by distorting the first sensor data, the distorting of the first sensor data being based at least in part on the control surface; and determining a level of degradation of the second sensor data.

L: The method as recited in any of paragraphs F-K, wherein determining the level of degradation of the second sensor data comprises at least: determining a first statistic associated with the first sensor data, the first sensor data representing one or more objects; determining a second statistic associated with second sensor data, the second sensor data representing the one or more objects; and determining a difference between the first statistic and the second statistic M: The method as recited in any of paragraphs F-L, further comprising determining at least one characteristic associated with the accumulation of the substance on the portion of the test surface, the at least one characteristic including at least one of: a contact angle associated with the accumulation; a size of the accumulation; a location of the accumulation; or a distribution associated with the accumulation, wherein generating the control data is based at least in part on the at least one characteristic.

N: The method as recited in any of paragraphs F-M, wherein the camera includes at least one of: a first camera located within a device that includes the test surface, the device being positioned proximate a location of the sensor during the test; or a second camera that is external to the vehicle, the second camera being oriented towards the test surface of the sensor.

O: The method as recited in any of paragraphs F-N, wherein the test includes a wind tunnel test and the substance includes water, and wherein determining the accumulation on the portion of the test surface comprises determining at least one of: a location of the water on the test surface; a size of the water on the test surface; a distribution of the water on the test surface; or an average duration that the water presents on the test surface P: One or more non-transitory computer-readable media storing instructions that, when executed by the one or more processors, cause one or more computing devices to perform operations comprising: receiving image data associated with a vehicle during a test, the image data comprising one or more images depicting a test surface associated with the vehicle; determining, based at least in part on the image data, an accumulation of a substance on a portion of the test surface; determining a portion of a control surface based at least in part on the accumulation of the substance on the portion of the test surface; and generating control data indicating at least the portion of the control surface, the control data to create the test surface for the sensor of the vehicle.

Q: The one or more non-transitory computer-readable media as recited in paragraph P, wherein the control surface comprises an artificial material adhered to an external surface of the control surface, the artificial material including at least one of: an index of refraction that is approximately equal to an index of refraction of the substance; a size that is based at least in part on the accumulation; or a location on the control surface that is based at least in part on the accumulation.

R: The one or more non-transitory computer-readable media as recited in paragraph P or paragraph Q, the operations further comprising determining that the control data is associated with at least one of: a vehicle speed; a droplet size; or a yaw angle associated with the vehicle.

S: The one or more non-transitory computer-readable media as recited in any of paragraphs P-R, the operations further comprising: receiving sensor data from the sensor, the sensor data being distorted, at least in part, by the control surface; and determining a level of degradation of the sensor data.

T: The one or more non-transitory computer-readable media as recited in any of paragraphs P-S, the operations further comprising determining at least one characteristic associated with the accumulation of the substance on the portion of the test surface, the at least one characteristic including at least one of: a contact angle associated with the accumulation; a size of the accumulation; a location of the accumulation; or a distribution associated with the accumulation, wherein generating the control data is based at least in part on the characteristic.

What is claimed is:
1. One or more computing devices comprising:
one or more processors; and
one or more computer-readable media storing instructions that, when executed by the one or more processors, cause the one or more computing devices to perform operations comprising:
receiving image data associated with a vehicle during a wind tunnel test, the image data comprising an image depicting a test surface associated with a sensor of the vehicle;
determining a characteristic associated with water accumulated on the test surface during the wind tunnel test;
determining, based at least in part on the characteristic, a control surface that includes at least a raindrop adhered to an external surface of the control surface;

applying the control surface to a driving test sensor, the driving test sensor comprising the sensor of the vehicle or a corresponding vehicle sensor;

conducting a driving test with the control surface on the driving test sensor;

receiving, from the sensor and in response to the driving test, sensor data from the driving test sensor, the sensor data being distorted, at least in part, by the control surface;

determining a level of degradation of the sensor data; and controlling the vehicle based at least in part on the level of degradation.

2. The one or more computing devices as recited in claim 1, the operations further comprising determining a parameter under which the wind tunnel test was performed, the parameter comprising at least one of:

a vehicle speed;

a droplet size; or a yaw angle associated with the vehicle, wherein the control surface is determined further based at least in part on the parameter.

3. The one or more computing devices as recited in claim 1, wherein:

the raindrop has an index of refraction between 1.2 and 1.4, a size determined based at least in part on the characteristic, and a location on the control surface that is based at least in part on the characteristic, and the control surface obscures a portion of a field of view of the driving test sensor to cause the sensor data to be distorted.

4. The one or more computing devices as recited in claim 1, wherein:

the image data comprises a plurality of first images captured by the sensor, the sensor data comprises a plurality of second images, and the operations further comprise:

determining a first statistic associated with the image data;

determining a second statistic associated with the sensor data; and determining a difference between the first statistic and the second statistic, wherein the first statistic and the second statistic comprise one or more of:

an average location of an accumulation on the test surface, an average size of the accumulation, or an average duration the accumulation presents on the test surface.

5. The one or more computing devices as recited in claim 1, wherein:

the sensor data comprises additional image data, and the additional image data is distorted based at least in part on the raindrop.

6. A method comprising:

receiving image data generated by a camera associated with a vehicle during a first test, the image data comprising an image depicting a test surface associated with a sensor of the vehicle;

determining, based at least in part on the image data, an accumulation of a substance on the test surface;

generating, based at least in part on the accumulation of the substance, control data indicating at least a portion of a control surface on which a material that is associated with the accumulation is to be placed;

generating the control surface including the material at the portion of the control surface;

disposing the control surface relative to a test sensor such that the material at the portion of the control surface impacts sensor data generated by the test sensor;

receiving, based at least in part on conducting a second test in which the control surface is disposed proximate the test sensor, sensor data from the test sensor; and determining a level of degradation of the sensor data caused by the control surface.

7. The method as recited in claim 6, wherein the material is adhered to an external surface of the control surface, the material including at least one of:

an index of refraction that is approximately equal to an index of refraction of the substance;

a size that is based at least in part on the accumulation; or a location on the control surface that is based at least in part on the accumulation.

8. The method as recited in claim 6, further comprising determining a parameter associated with the test, the parameter comprising at least one of:

a vehicle speed;

a droplet size; or a yaw angle associated with the vehicle, wherein generating the control data is based at least in part on the parameter.

9. The method as recited in claim 6, wherein the control surface comprises a filter coupled to the test sensor.

10. The method as recited in claim 9, wherein determining the level of degradation of the sensor data comprises at least:

determining a first statistic associated with the sensor data, the sensor data representing one or more objects;

determining a second statistic associated with additional sensor data, the additional sensor data representing the one or more objects; and determining a difference between the first statistic and the second statistic.

11. The method as recited in claim 6, further comprising:

receiving first sensor data generated by the sensor;

generating second sensor data by distorting the first sensor data, the distorting of the first sensor data being based at least in part on the control surface; and determining a level of degradation of the second sensor data.

12. The method as recited in claim 11, wherein determining the level of degradation of the second sensor data comprises at least:

determining a first statistic associated with the first sensor data, the first sensor data representing one or more objects;

determining a second statistic associated with second sensor data, the second sensor data representing the one or more objects; and determining a difference between the first statistic and the second statistic.

13. The method as recited in claim 6, further comprising determining at least one characteristic associated with the accumulation of the substance on the portion of the test surface, the at least one characteristic including at least one of:

a contact angle associated with the accumulation;

a size of the accumulation;

a location of the accumulation; or a distribution associated with the accumulation, wherein generating the control data is based at least in part on the at least one characteristic.

14. The method as recited in claim 6, wherein the camera includes at least one of:
- a first camera located within a device that includes the test surface, the device being positioned proximate a location of the sensor during the test; or
- a second camera that is external to the vehicle, the second camera being oriented towards the test surface of the sensor.

15. The method as recited in claim 6, wherein the first test includes a wind tunnel test and the substance includes water, and wherein determining the accumulation on the portion of the test surface comprises determining at least one of:
- a location of the water on the test surface;
- a size of the water on the test surface;
- a distribution of the water on the test surface; or
- an average duration that the water presents on the test surface.

16. The method of claim 6, wherein the control surface is separate from the test sensor and disposing the control surface relative to the test sensor comprises placing the control surface on a surface of the test sensor such that the material at least partially obstructs a field of view of the test sensor.

17. The method of claim 16, wherein:
- the test sensor comprises the sensor of the vehicle; and
- the second test comprises a driving test including driving the vehicle with the control surface on the surface of the sensor such that the material at least partially obstructs the field of view of the sensor, the method further comprising:
  - removing, based at least in part on completing the second test, the control surface from the sensor; and
  - controlling, based at least in part on the level of degradation, the vehicle with the control surface removed from the test sensor.

18. One or more non-transitory computer-readable media storing instructions that, when executed by the one or more processors, cause one or more computing devices to perform operations comprising:
- receiving image data associated with a vehicle during a test, the image data comprising one or more images depicting a test surface associated with the vehicle;
- determining, based at least in part on the image data, an accumulation of a substance on a portion of the test surface;
- generating, based at least in part on the accumulation of the substance, control data indicating a portion of a control surface for placing a material representative of the accumulation;
- receiving, from a test sensor, sensor data generated during a second test in which the control surface, generated according to the control data and including the material that is associated with the accumulation at the portion of the control surface, is positioned proximate the test sensor; and
- determining a level of degradation of the sensor data caused by the control surface.

19. The one or more non-transitory computer-readable media as recited in claim 18, wherein the material includes at least one of:
- an index of refraction that is approximately equal to an index of refraction of the substance;
- a size that is based at least in part on the accumulation; or
- a location on the control surface that is based at least in part on the accumulation.

20. The one or more non-transitory computer-readable media as recited in claim 18, the operations further comprising determining that the control data is associated with at least one of:
- a vehicle speed;
- a droplet size; or
- a yaw angle associated with the vehicle.

21. The one or more non-transitory computer-readable media as recited in claim 18, the operations further comprising:
- receiving sensor data from the sensor, the sensor data being distorted, at least in part, by the control surface; and
- determining a level of degradation of the sensor data.

22. The one or more non-transitory computer-readable media as recited in claim 18, the operations further comprising determining at least one characteristic associated with the accumulation of the substance on the portion of the test surface, the at least one characteristic including at least one of:
- a contact angle associated with the accumulation;
- a size of the accumulation;
- a location of the accumulation; or
- a distribution associated with the accumulation, wherein generating the control data is based at least in part on the characteristic.

\* \* \* \* \*